United States Patent
Nishimura et al.

(10) Patent No.: US 9,367,048 B2
(45) Date of Patent: Jun. 14, 2016

(54) VEHICLE CONTROLLER

(71) Applicant: FUJITSU TEN LIMITED, Kobe-shi, Hyogo (JP)

(72) Inventors: Ryuji Nishimura, Kobe (JP); Akira Takee, Kobe (JP); Shingo Taguchi, Kobe (JP); Takeshi Sakamoto, Kobe (JP); Tetsuya Nomura, Kobe (JP); Satoshi Harumoto, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 286 days.

(21) Appl. No.: 13/781,154

(22) Filed: Feb. 28, 2013

(65) Prior Publication Data
US 2013/0257591 A1   Oct. 3, 2013

(30) Foreign Application Priority Data

Mar. 29, 2012   (JP) .................... 2012-075543

(51) Int. Cl.
| | |
|---|---|
| B60R 25/24 | (2013.01) |
| G05B 11/01 | (2006.01) |
| B60R 25/20 | (2013.01) |
| F02N 11/08 | (2006.01) |
| H04M 11/00 | (2006.01) |
| H04Q 9/00 | (2006.01) |

(52) U.S. Cl.
CPC .............. *G05B 11/01* (2013.01); *B60R 25/24* (2013.01); *B60R 25/209* (2013.01); *B60R 2325/205* (2013.01); *F02N 11/0807* (2013.01); *H04M 11/00* (2013.01); *H04Q 9/00* (2013.01)

(58) Field of Classification Search
CPC .... B60R 25/24; B60R 25/209; F02N 11/0807
USPC ................ 340/5.72, 426.13, 426.16, 426.17, 340/426.19; 307/10.6; 701/2, 29.6; 123/179.2
See application file for complete search history.

(56) References Cited

U.S. PATENT DOCUMENTS

| | | | |
|---|---|---|---|
| 2003/0193390 A1* | 10/2003 | Muramatsu | 340/426.13 |
| 2008/0255888 A1* | 10/2008 | Berkobin et al. | 705/4 |

FOREIGN PATENT DOCUMENTS

JP    A-2006-352460    12/2006

\* cited by examiner

*Primary Examiner* — Steven Lim
*Assistant Examiner* — Benyam Haile
(74) *Attorney, Agent, or Firm* — Oliff PLC

(57) ABSTRACT

A vehicle controller installed in and controlling a vehicle includes an obtaining part that obtains identification information specific to the vehicle, a communicator that communicates with an information processor located outside the vehicle by transmitting and receiving information, a match judging part that makes a matching judgment on whether a plurality of the identification information obtained at different times are identical, and a judging part that judges whether to permit the control of the vehicle based on the matching judgment. The information processor also can make the matching judgment and only transmit a control command to the vehicle controller when there is a match.

12 Claims, 30 Drawing Sheets

VEHICLE CONTROLLER

BACKGROUND OF THE INVENTION

1. Field of the Invention

The invention relates to a technology that controls a vehicle by use of a mobile terminal.

2. Description of the Background Art

Conventionally known are a remote starter that controls starting of a driving apparatus such as an engine or a motor of user's vehicle, and a remote door lock system that controls locking or unlocking of doors of user's vehicle, by use of a mobile terminal. By use of these technologies, a user can start the driving apparatus or can lock or unlock the doors, of user's vehicle that is away from the user. Therefore, in an example, the user can turn on an air conditioner to control the temperature of the vehicle cabin to be appropriate before the user gets in user's vehicle. In another example, the user can open or close the doors of user's vehicle without inserting a key in the vehicle. Known these days is a remote operation system that operates an in-vehicle apparatus of user's vehicle via a center by use of a mobile phone as the mobile terminal.

In the case where a vehicle is controlled by a remote controller such as the remote starter or the remote door lock system, the in-vehicle apparatus to be controlled and user's remote controller are associated so that the user does not control another in-vehicle apparatus wrongly. In the case of a remote operation system that operates user's in-vehicle apparatus through the center by use of the mobile phone, the mobile phone and the in-vehicle apparatus are associated.

However, in the case where the mobile phone and the in-vehicle apparatus are associated, a stranger can operate user's vehicle from a distance when the stranger's in-vehicle apparatus is insidiously installed in the proper user's vehicle. In this case, the items in the vehicle or the vehicle itself are in danger of being stolen.

SUMMARY OF THE INVENTION

According to one aspect of the invention, a vehicle controller is installed in a vehicle and controls one or more operations of the vehicle. The vehicle controller includes a communicator that communicates with an information processor that is located outside the vehicle by transmitting and receiving information; and a control unit configured to: (i) obtain identification information specific to the vehicle, (ii) make a matching judgment on whether a plurality of the identification information obtained at different times are identical or not, and (iii) judge whether to permit the control of the one or more operations of the vehicle based on the matching judgment. Upon reception of a request for the control of the one or more operations of the vehicle from the information processor, the control unit obtains updated data of the identification information, and makes the matching judgment on whether previous data of the identification information stored in the information processor and the updated identification information are identical or not. The control unit permits the control of the one or more operations of the vehicle when the previous identification information and the updated identification information are identical, and does not permit the control of the one or more operations of the vehicle when the previous identification information and the updated identification information are not identical.

According to another aspect of the invention, a vehicle controller is installed in a vehicle and controls one or more operations of the vehicle. The vehicle controller includes a detector that detects reconnection of a battery of the vehicle; a communicator that communicates with an information processor that is located outside the vehicle by transmitting and receiving information; and a control unit configured to: (i) obtain identification information specific to the vehicle, (ii) make a matching judgment on whether a plurality of the identification information obtained at different times are identical or not, and (iii) judge whether to permit the control of the one or more operations of the vehicle based on the matching judgment. When the detector detects the reconnection of the battery, the control unit obtains updated data of the identification information, and makes the matching judgment on whether previous data of the identification information stored in the information processor and the updated identification information are identical or not. The control unit permits the control of the one or more operations of the vehicle when the previous identification information and the updated identification information are identical, and does not permit the control of the one or more operations of the vehicle when the previous identification information and the updated identification information are not identical.

Since the remote operation system uses the identification information specific to the vehicle, the vehicle equipped with the vehicle controller can be identified. Concretely, whether the updated identification information and the previous identification information are identical is judged. Therefore, even when the vehicle controller is installed on another vehicle, the remote operation system can judge that such situation has happened. That is, when the vehicle controller does not belong to a proper user, the vehicle cannot be controlled.

Therefore, the object of the invention is to provide a technology relevant to vehicle control that is capable of making judgment on whether a vehicle controller that controls a vehicle belongs to a proper user, and of changing permission of the vehicle control based on a result of the judgment.

These and other objects, features, aspects and advantages of the present invention will become more apparent from the following detailed description of the present invention when taken in conjunction with the accompanying drawings.

DESCRIPTION OF THE EMBODIMENTS

Hereinafter, some embodiments of the invention are described with reference to attached drawings.

1. First Embodiment

1-1. Outline of System

Figure 1:
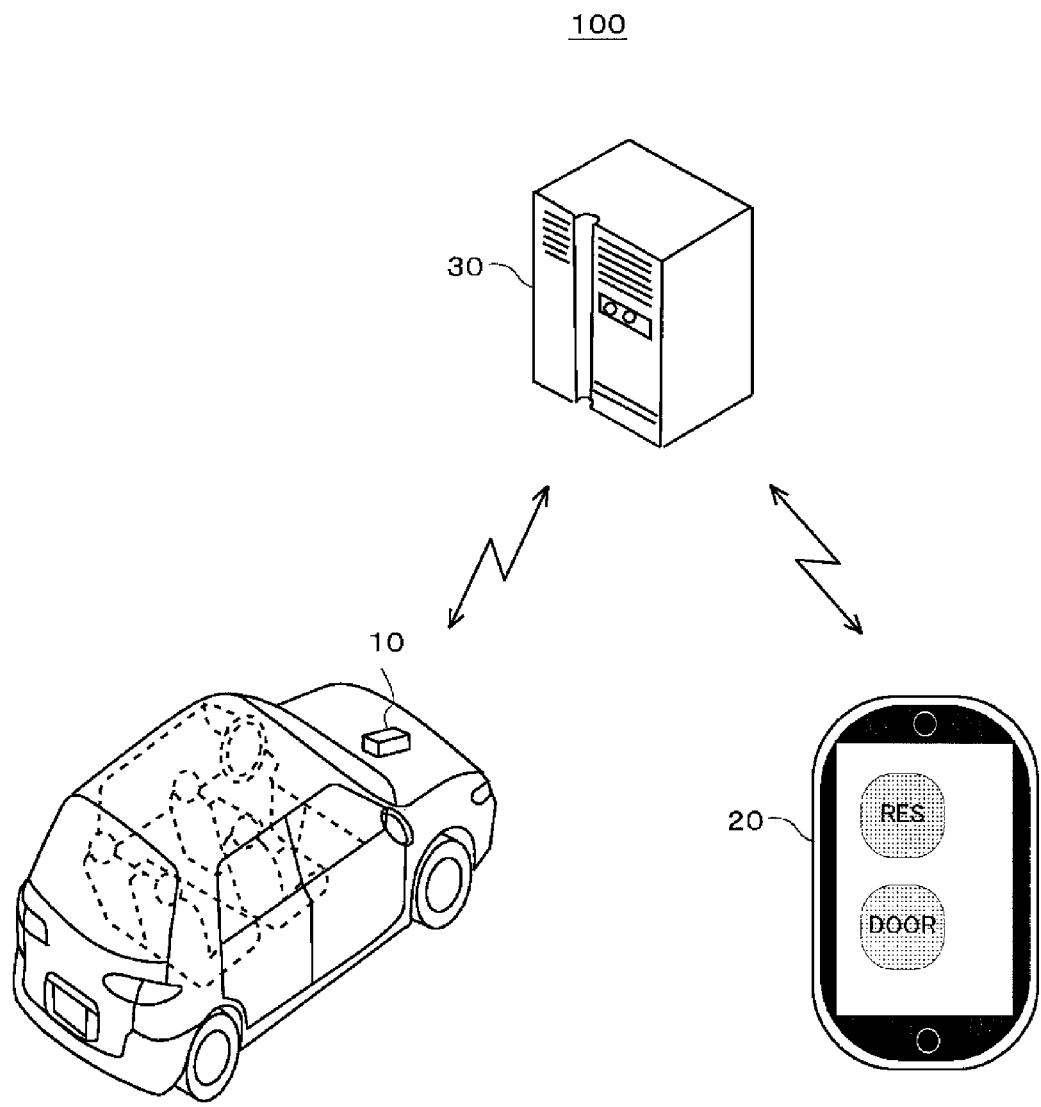
FIG. 1 shows an outline of a vehicle control system.

FIG. 1 shows an outline of a vehicle control system 100 of the embodiment. The vehicle control system 100 includes a vehicle controller 10, a mobile terminal 20 and a center 30.

The vehicle controller 10 is installed in a vehicle to control the vehicle in accordance with the control information transmitted by the center 30. The vehicle controller 10 that is coupled with the center 30 so as to communicate with each other transmits to the center 30 vehicle information including position information at a predetermined timing, and receives via the center 30 from the mobile terminal 20 the control information such as a request for starting or a request for door lock. In an example, upon receiving the request for starting from the center 30, the vehicle controller 10 controls the starting of the driving apparatus of the vehicle or various apparatuses. Or, upon receiving the request for door lock, the vehicle controller 10 controls locking of the doors of the vehicle.

In the invention, it is judged by use of identification information that is information specific to each vehicle, on whether the vehicle controller 10 belongs to a proper user. When it is judged that the vehicle controller 10 belongs to the proper user, various controls such as for starting and for door lock are executed.

Here, the door lock control includes both of the controls for locking and unlocking the doors of a vehicle. The driving apparatus is an engine or a motor. Each of the engine and the motor can be used in the invention. However, for convenience sake, some embodiments may be described by use of the engine. The various apparatuses are, for example, an air conditioner. That is, for example in the starting control, starting/stop of the engine or the motor, on/off operation of the air conditioner are controlled. Hereafter, "door lock" may be used for collective indication of locking doors and unlocking doors. Or, "driving apparatus" may be used collectively as the targets to be remotely started, and "starting" may be used for collective indication of the actions such as start/stop and on/off operation.

The mobile terminal 20 is a mobile electronic device carried by a user, for example, a smartphone, a tablet PC, a mobile phone or a PDA (Personal Digital Assistant). The mobile terminal 20 stores an application for operating a vehicle from a distance. Here, as the examples of the application, there are the application for locking or unlocking doors of a vehicle from a distance, and the application for starting a driving apparatus from a distance. The user can remotely make various settings or send the request for door lock or for starting, by executing the application stored in the mobile terminal 20. The mobile terminal 20 is configured to be communicatively coupled to the center 30, and transmits to the center 30 the requests for door lock and for starting, the information on various settings and the position information of the mobile terminal 20.

The center 30 is an information processor that totally controls the vehicle control system 100. The center 30 is configured to be communicatively coupled to the vehicle controller 10 and to the mobile terminal 20, and controls door lock or door unlock, and starting or stop of the driving apparatus, by transmitting and receiving the request for door lock and the request for starting with each other. Concretely, upon receiving the request for door lock from the mobile terminal 20, the center 30 makes control such as for-transmitting the request for door lock to the vehicle controller 10. In another concrete example, the center 30 receives from the vehicle the vehicle information including the position information, and also receives from the mobile terminal 20 the request for starting and the position information. Upon receiving the request for starting from the mobile terminal, the center 30 makes control, such as judgment or direction on whether to implement starting, based on the position information of the mobile terminal 20 and the position information of the vehicle.

The vehicle control system 100 of the embodiment is capable of controlling a vehicle only when it is judged that the vehicle controller 10 belongs to the proper user through the judgment made based on the information specific to each vehicle when the vehicle controller 10 receives the request for door lock from the center 30. Detailed hereafter are the configuration of and the processing on the vehicle control system 100.

1-2. Configuration of Vehicle Controller

Figure 2:
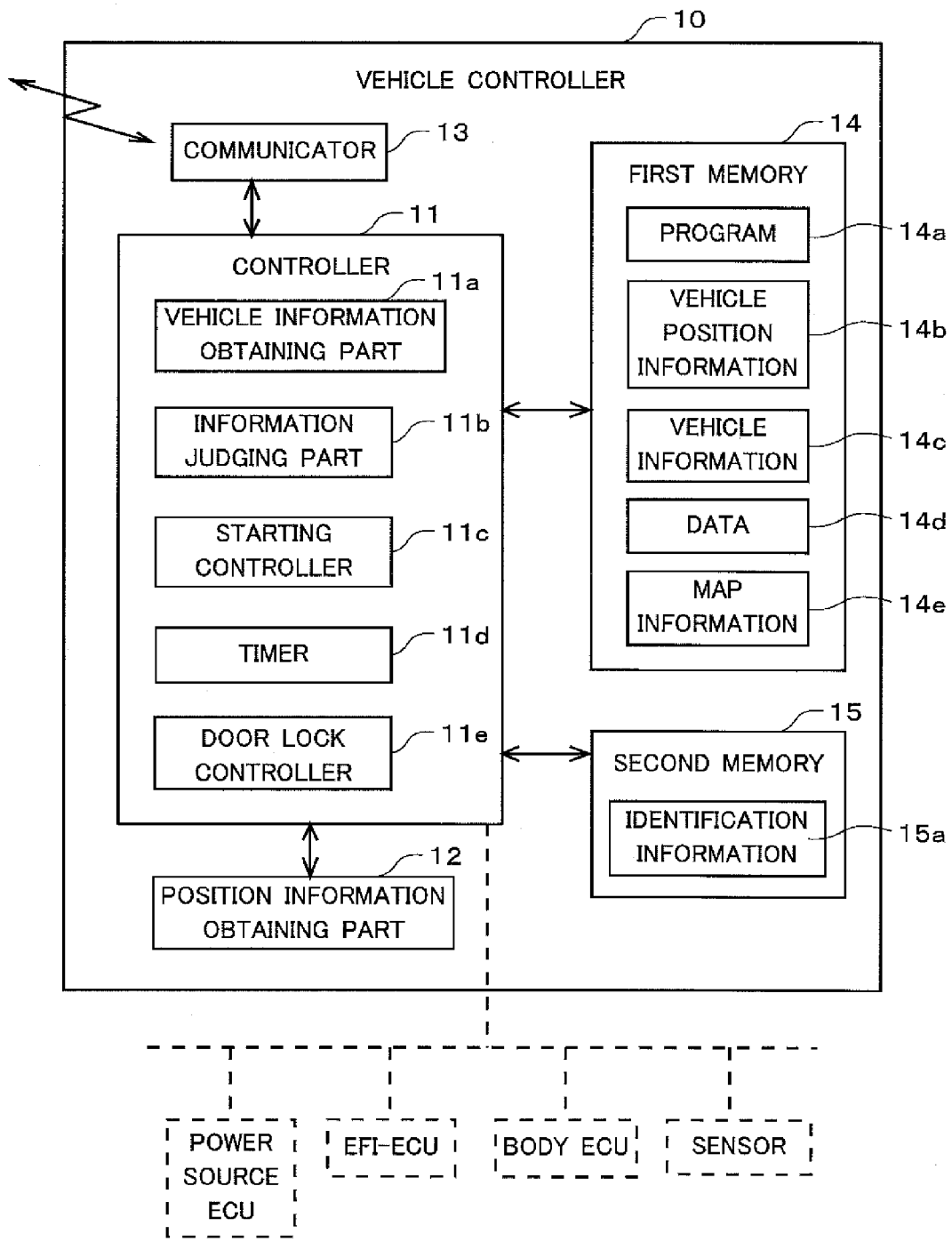
FIG. 2 shows a schematic block diagram of another vehicle controller.

First, the configuration of the vehicle controller 10 is described. FIG. 2 shows a schematic block diagram of the vehicle controller 10. As shown in FIG. 2, the vehicle controller 10 includes a controller 11 (that may be referred to as a control unit), a position information obtaining part 12, a communicator 13, a first memory 14 and a second memory 15.

The controller 11 that includes a vehicle information obtaining part 11a, an information judging part 11b, a starting controller 11c, a timer 11d and a door lock controller 11e, is a computer that has a CPU, RAM and ROM not shown in FIG.

2. The controller 11 that is connected to the communicator 13 and the first memory 14 included in the vehicle controller 10, controls the whole of the vehicle controller 10 by transmitting and receiving information based on a program 14a stored in the first memory 14. Arithmetic processing executed by the CPU based on the program stored in the first memory 14 provides the functions of the controller 11, such as of the starting controller 11c and the door lock controller 11e. Since the controller 11 controls the overall processing on the vehicle controller 10, the controller 11 also controls the processing other than the processing executed by the vehicle information obtaining part 11a, the information judging part 11b, the starting controller 11c, the timer 11d and the door lock controller 11e described above.

The controller 11 is communicatively coupled to other various sensors and ECUs (Electronic Control Units) installed in the vehicle via an on-vehicle LAN (Local Area Network) such as a CAN (Controller Area Network) for transmitting and receiving various types of information. The sensors coupled to the controller 11 are, for example, a vehicle velocity sensor and a steering angle sensor that detect the vehicle driving conditions. The ECUs coupled to the controller 11 are, for example, EFI-ECU (Electric Fuel Injection-ECU) that controls fuel injection, a body ECU that controls door lock and door unlock, and a power source ECU that supplies power to the respective ECUs installed in the vehicle.

The vehicle information obtaining part 11a obtains the vehicle information as the information indicating the driving conditions of the vehicle and the conditions of other ECUs. The vehicle information obtaining part 11a obtains the identification information. The identification information is specific to each vehicle and available for identifying individual vehicles, and includes, for example, VIN (Vehicle Identification Number), and includes a wireless ID in the case where the vehicle is equipped with a remote keyless entry system. That is, the vehicle information obtaining part 11a obtains the identification information as well as the vehicle information that is the output of these sensors and ECUs through the CAN. The identification information is transmitted to the center 30 at a predetermined timing, such as when an ignition switch is turned off.

The information judging part 11b judges the contents of the vehicle information obtained from other sensors and the ECUs in the vehicle, and judges the contents of the information received from the center 30. Besides the information described above, the vehicle information includes the information on the ignition switch being switched on or off. The information received from the center 30 includes a command relevant to the request for door lock or the request for starting the driving apparatus.

The starting controller 11c controls the starting or the stop of the driving apparatus and various apparatuses that are installed in the vehicle. That is, the starting controller 11c transmits an applicable direction to the ECU to be controlled upon receiving the command of the request for starting from the center 30. In an example, when receiving from the center 30 the command of the request for starting the driving apparatus, the starting controller 11c transmits via the CAN the direction for starting to the ECU that controls the driving of the driving apparatus. When receiving the command of the request for starting the air conditioner, the starting controller 11c transmits via the CAN the direction for starting to the ECU that controls the driving of the air conditioner.

The timer 11d measures elapsed time. In an example, when the period of time for driving the driving apparatus by use of the remote starting function is determined in advance, the timer 11d measures the elapsed time from the starting, and judges whether the predetermined period of time has elapsed. The timer 11d is also capable of measuring clock time, for example, measuring the clock time at the time of the starting.

The door lock controller 11e controls the door lock and the door unlock of the vehicle. That is, the door lock controller 11e transmits an applicable direction to the body ECU upon receiving the command of the request for door lock from the center 30. In an example, upon receiving the command of the request for door unlock from the center 30, the door lock controller 11e transmits via the CAN the direction for door unlock to the body ECU.

The position information obtaining part 12 obtains the position information indicating the current position of the vehicle controller 10. For example, GPS (Global Positioning System), may be used as the position information obtaining part 12. The position information includes latitude information and longitude information. That is, the position information obtaining part 12 obtains the latitude information and the longitude information of the current position by use of the GPS.

In some environments where the vehicle controller 10 is installed, the position information is not available through the GPS. In this case, the position information obtaining part 12 obtains the information indicating that the position information is undetermined (hereinafter, referred to as "undetermined-information") as the information indicating that the position information is not available.

The position information also indicates the position of the vehicle because the obtained position information indicates the position of the vehicle controller 10 that is installed in the vehicle. Therefore, the position information obtained by the position information obtaining part 12 is referred to as "vehicle position information" hereafter. That is, the vehicle position information includes the position information including the latitude information and the longitude information obtained by the GPS, and the undetermined-information when the position information is not available through the GPS. The vehicle position information 14b is stored in the first memory 14.

The communicator 13 is communicatively coupled to the center 30 for transmitting information to and receiving information from the center 30. In an example, the communicator 13 transmits the vehicle position information and the identification information to the center 30, and receives from the center 30 the command such as of the request for door lock or the request for starting, that is, the control information. Communication between the vehicle controller 10 and the center 30 is through a so-called mobile telephone network. Therefore, the communicator 13 also judges whether the communicator 13 is located in "service area" where the communication with the center 30 is available, or in "out-of-service area" where the communication is not available. The data such as the command transmitted by the center 30 are stored in the first memory 14.

The first memory 14 stores the program 14a, the vehicle position information 14b, vehicle information 14c, data 14d and map information 14e. The first memory 14 of the embodiment is nonvolatile semiconductor memory where reading and writing data are electrically available and that is capable of keeping data even in a power-off state. For example, EEPROM (Electrical Erasable Programmable Read-Only Memory) or a flash memory may be used as the first memory 14. However, other memory media or a hard disk drive including a magnetic disk may be also used. The program is so-called system software that the controller 11 reads out to execute for controlling the vehicle controller 10. The data 14d are, for example, various data received from the center 30. The map information 14e includes road information and facility information around the country or in a predetermined wide area.

The second memory 15 stores identification information 15a. The second memory 15 of the embodiment is volatile semiconductor memory where reading and writing data are electrically available and where the data are deleted when power is disconnected. For example, RAM, may be used as the second memory 15. In the second memory 15, since power is kept supplied from the backup battery installed in the vehicle, the identification information 15a is not deleted even when power supply from a battery is stopped by the ignition switch being turned off. However, when the vehicle controller 10 itself is taken off from the vehicle, the identification information 15a is deleted.

1-3. Configuration of Mobile Terminal

Figure 3:
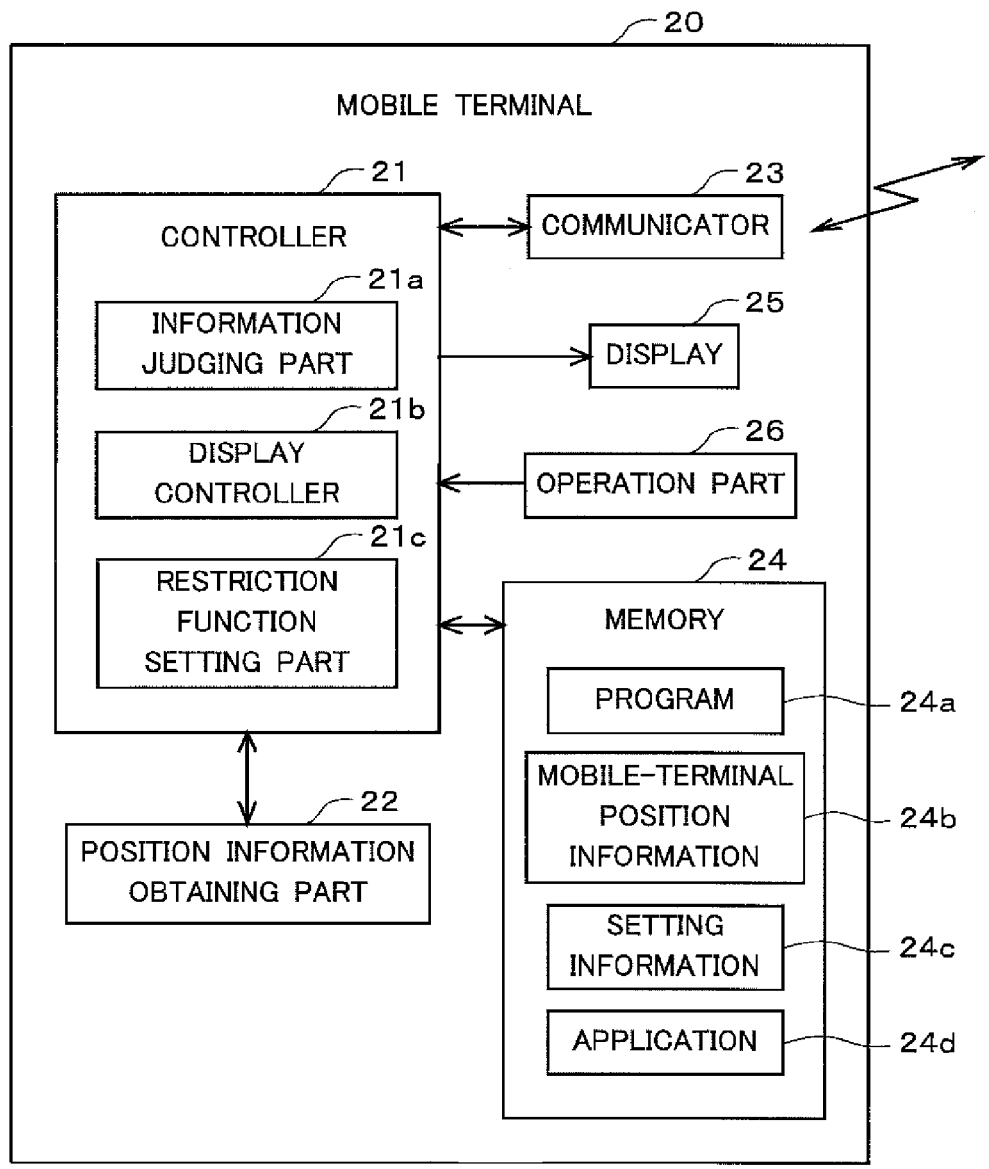
FIG. 3 shows a schematic block diagram of a mobile terminal.

Described next is the configuration of the mobile terminal 20. FIG. 3 shows a schematic block diagram of the mobile terminal 20. As shown in FIG. 3, the mobile terminal 20 includes a controller 21, a position information obtaining part 22, a communicator 23, a memory 24, a display 25 and an operation part 26.

The controller 21 that includes an information judging part 21a, a display controller 21b and a restriction function setting part 21c, is a computer that has a CPU, RAM and ROM not shown in FIG. 3. The controller 21 that is connected to the communicator 23, the memory 24, and others included in the mobile terminal 20, transmits and receives information based on a program 24a stored in the memory 24, and controls the whole of the mobile terminal 20. Arithmetic processing executed by the CPU based on the program stored in the memory 24 provides the functions of the controller 21 such as of the information judging part 21a and the display controller 21b. Since the controller 21 controls the overall processing on the mobile terminal 20, the controller 21 controls the processing other than the processing executed by the information judging part 21a, the display controller 21b and the restriction function setting part 21c, besides the processing for executing the functions of the applications relevant to door lock and remote starting.

The information judging part 21a judges the contents of the obtained information. In an example, the information judging part 21a judges the contents of the information received from the center 30, and judges the contents of the commands entered via the operation part 26 of the mobile terminal 20. The information received from the center 30 includes, for example, an inquiry relevant to the vehicle information and an inquiry on whether to implement the starting. The command entered via the operation part 26 of the mobile terminal 20 includes, for example, the command of the request for door lock and the command of the request for starting the driving apparatus.

The display controller 21b makes control so as to display an image on the display 25 of the mobile terminal 20. Concretely, the display controller 21b makes control to display on the display 25 a screen such as an operation screen that accepts a direction for door lock and a direction for starting the driving apparatus, or a check screen received from the center 30.

The restriction function setting part 21c activates or deactivates the function that restricts the processing for the remote starting of the driving apparatus of the vehicle (hereinafter, referred to as "restriction function") when predetermined conditions are met. The predetermined conditions are the conditions that determine whether to execute the function for the remote starting of the driving apparatus of the vehicle (hereinafter, referred to as "restriction conditions"). The restriction function setting part 21c also has a function to change the restriction conditions. One of the restriction conditions relates to the distance between the position of the mobile terminal 20 at the time of the request for starting and the vehicle position at the time of parking start. The restriction function based on this restriction condition is indicated as "distance-restriction function."

The information indicating the restriction function activated or deactivated and the restriction conditions (hereinafter, referred to as "setting information" collectively) are stored in the memory 24. When the user selects a setting mode by operating the mobile terminal, setting information 24c is read out from the memory 24 and displayed on the display 25. The user can set new setting information in terms of the displayed setting information by activating or deactivating the restriction function, or by changing the conditions in accordance with a change screen. The new setting information is transmitted to the center 30 as well as being stored in the memory 24. The setting information 24c may not be stored in the memory 24 of the mobile terminal 20, but be stored only in a first memory 33 of the center 30. In this case, the restriction function setting part 21c reads out the setting information from the first memory 33 of the center 30.

The position information obtaining part 22 obtains the position information indicating the current position of the mobile terminal 20 (hereinafter, referred to as "mobile-terminal position information"). For example, the GPS may be used as the position information obtaining part 22. The mobile-terminal position information includes the latitude information and the longitude information. That is, the position information obtaining part 22 obtains the latitude information and the longitude information of the current position by use of the GPS. The obtained mobile-terminal position information 24b is stored in the memory 24.

The communicator 23 is communicatively coupled to the center 30 for transmitting information to and receiving information from the center 30. In an example, the communicator 23 transmits to the center 30 the command of the request for door lock or the request for starting, or the mobile-terminal position information, and receives from the center 30 the command of the request for communication connection or an inquiry on whether to implement the starting. Communication between the mobile terminal 20 and the center 30 is through the so-called mobile telephone network. Therefore, the communicator 23 also judges whether the communicator 23 is located in "service area" where the communication with the center 30 is available, or in "out-of-service area" where the communication is not available.

The memory 24 stores the program 24a, the mobile-terminal position information 24b, the setting information 24c and an application 24d. The memory 24 of the embodiment is nonvolatile semiconductor memory where reading and writing data are electrically available and that is capable of keeping data even in power-off state. For example, EEPROM or a flash memory may be used as the memory 24. However, other memory media or a hard disk drive including a magnetic disk may be used. The program 24a is so-called system software that the controller 21 reads out to execute for controlling the mobile terminal 20. The application 24d is a control program to control door lock or to start the driving apparatus from a distance.

The display 25 displays an operation screen such as of the application for controlling the door lock or for the remote starting function, or the check screen on which the user checks the vehicle information transmitted by the center 30. For example, a liquid crystal display or an organic EL display may be used as the display 25.

The operation part 26 is an information input apparatus including a mechanical button and a touch panel. The user can make various operations relevant to the control of the door lock and the remote starting function, and can set and change the setting information, by operating the operation part 26. The operation part 26 may be configured as a unit of the display 25.

1-4. Configuration of Center

Figure 4:
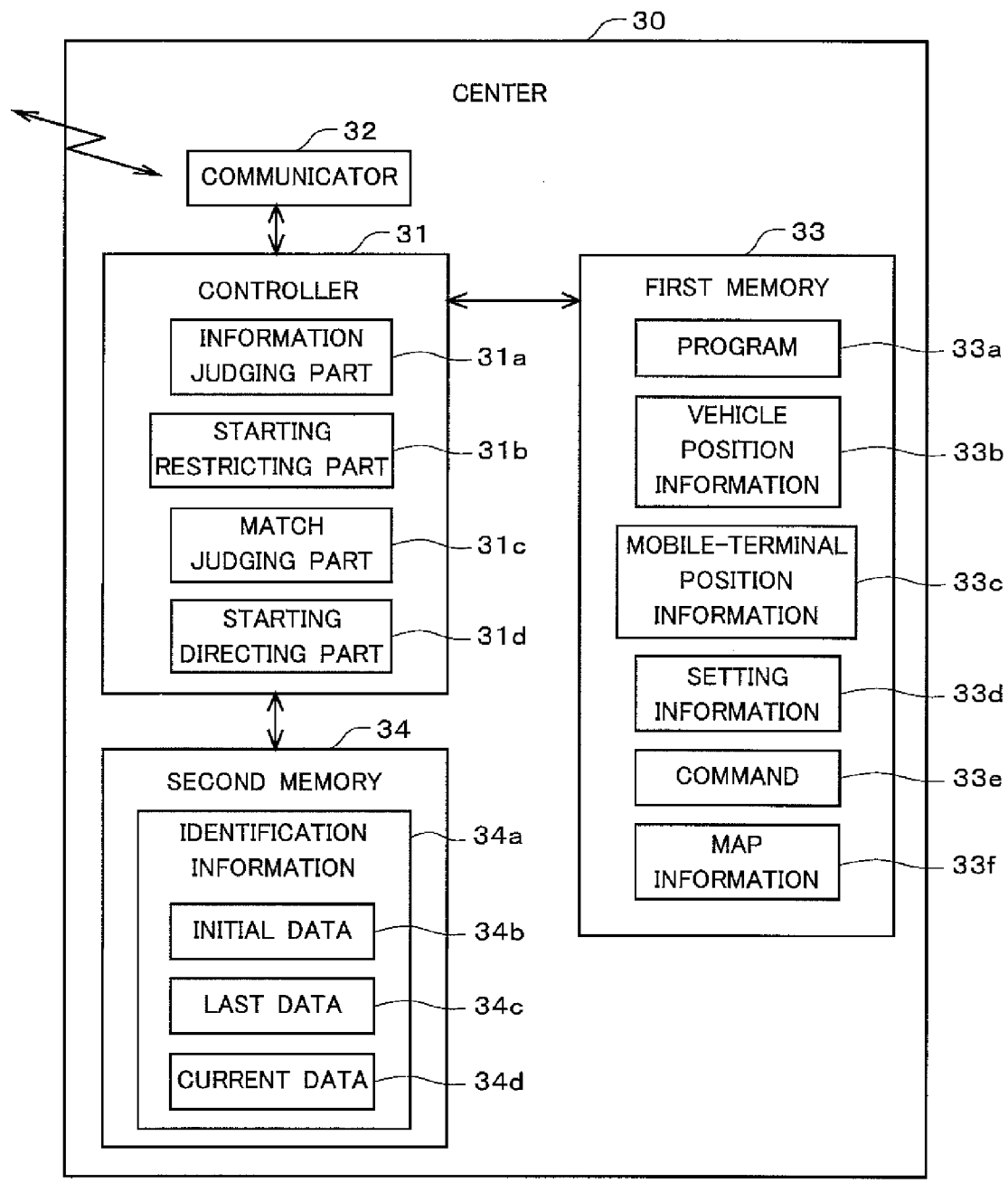
FIG. 4 shows a schematic block diagram of another center.

Next, the configuration of the center 30 is described. FIG. 4 shows a schematic block diagram of the center 30. As shown in FIG. 4, the center 30 includes a controller 31, a communicator 32, the first memory 33 and a second memory 34.

The controller 31 that includes an information judging part 31a, a starting restricting part 31b, a match judging part 31c and a starting directing part 31d, is a computer that has a CPU, RAM and ROM not shown in FIG. 4. The controller 31 that is connected to the communicator 32 and the first memory 33 included in the center 30, controls the whole of the center 30 by transmitting and receiving information based on the program stored in the first memory 33. Arithmetic processing executed by the CPU based on the program 33a stored in the first memory 33 provides the functions of the controller 31, such as of the information judging part 31a and the starting restricting part 31b. Since the controller 31 controls the overall processing on the center 30, the controller 31 also controls the processing other than the processing executed by the information judging part 31a, the starting restricting part 31b, the match judging part 31c and the starting directing part 31d.

The information judging part 31a judges the contents of the information and the commands received from the vehicle controller 10 or the mobile terminal 20. Concretely, the information judging part 31a judges whether the information received from the vehicle controller 10 is the identification information, vehicle position information, the information indicating execution of door lock or door unlock, the information indicating execution of starting or stopping the driving apparatus, or the information on the ignition switch being switched on or off. The information judging part 31a also judges whether the information received from the mobile terminal 20 is the mobile-terminal position information, the command of the request for door lock, the command of the request for starting the driving apparatus, or the change information of the setting information.

Upon reception of the command of the request for starting from the mobile terminal 20, the starting restricting part 31b judges whether to restrict the starting of the driving apparatus based on the setting information. Concretely, upon the judgment that the command of the request for starting has been received from the mobile terminal 20, the starting restricting part 31b judges whether to start the driving apparatus based on the vehicle position information, the mobile-terminal position information and the setting information.

Here is an example case where the distance-restriction function is activated, and where the restriction conditions are set based on the distance between the vehicle position at the time of parking start and the position of the mobile terminal at the time of the request for starting. The starting restricting part 31b derives the distance between the vehicle position at the time of parking start and the position of the mobile terminal at the time of the request for starting, based on the vehicle position information and the mobile-terminal position information, and judges whether to restrict the starting of the driving apparatus by comparing the obtained distance and the restriction conditions.

More concretely, the starting restricting part 31b calculates the distance between the vehicle and the mobile terminal 20 by comparing vehicle position information 33b at the time of the ignition switch being switched off, the vehicle position information 33b being read out from the first memory 33 (that is, the vehicle position information at the time of parking start), and mobile-terminal position information 33c received from the mobile terminal 20 (that is, the mobile-terminal position information at the time of the request for starting). Then, the starting restricting part 31b reads out from the first memory 33 the restriction distance included in setting information 33d, and judges whether the calculated distance is equal to or longer than the restriction distance. The restriction distance is one of the restriction conditions, in terms of the distance for restricting the starting.

The starting restricting part 31b continues the processing for starting the driving apparatus when the calculated distance is shorter than the restriction distance, or restricts the processing for starting when the calculated distance is equal to or longer than the restriction distance. The restriction of the processing for starting includes prohibition of the processing for starting. In an example, the processing for restricting the processing for starting is to cancel the processing for starting when the processing for starting is prohibited, and to confirm with the user whether to continue the processing for starting when the processing for starting is restricted.

When receiving the command of the request for starting or the command of the request for door lock, the match judging part 31c judges whether a plurality of identification information obtained at different times are identical. In the configuration of the embodiment, the center 30 receives the identification information from the vehicle controller 10 at a prescribed timing, and stores the received identification information in the second memory 34. Since the vehicle controller 10 and the mobile terminal 20 are associated, the center 30 stores a set of the identification information associated with the vehicle controller 10 for each (or for each of the mobile terminals 20). That is, the match judging part 31c compares the plurality of identification information among the set of the identification information received from the vehicle controller 10 associated with the mobile terminal 20 having transmitted the command of each of the requests, when receiving the request for starting or the request for door lock from the mobile terminal 20.

The identification information is the information for identifying individual vehicles as described above. Thus, in the case of the vehicle newly equipped with the vehicle controller that has been installed in another vehicle, the updated identification information is not identical with the identification information obtained before. The case where the previous identification information and the updated identification information are not identical is seen when the vehicle controller 10 is installed now in the vehicle different from the previous vehicle. That is, in this case, it is highly possible that the vehicle controller 10 does not belong to the proper user. On the other hand, when the vehicle controller that has been installed in a certain vehicle is installed in the same vehicle as is, the two of the identification information are identical. Detailed later is the matching judgment regarding the identification information executed by the match judging part 31c.

When executing the command of the request for starting or the command of the request for door lock, the starting directing part 31d executes the processing for transmitting each of the commands to the vehicle controller 10. Concretely, upon reception of the command of the request for door lock from the mobile terminal 20, the starting directing part 31d transmits the command of the request for door lock to the vehicle controller 10, when the plurality of identification information are identical. Upon reception of the command of the request for starting from the mobile terminal 20, the starting restricting part 31b judges that the processing for starting is to be continued, and when the plurality of identification information are identical, the starting directing part 31d transmits the command of the request for starting to the vehicle controller 10.

The communicator 32 is configured to be communicatively coupled to the vehicle controller 10 and to the mobile terminal 20 to transmit and receive information mutually. In an example, the communicator 32 transmits to the vehicle controller 10 the command of the request for door lock or the command of the request for starting, and transmits to the mobile terminal 20 the execution result or the information for confirming whether to continue the processing for starting regarding the request. The communicator 32, in an example, receives from the vehicle controller 10 the vehicle position information and the identification information, and from the mobile terminal 20 the mobile-terminal position information and the command of the request for door lock or the command of the request for starting. Communications with the vehicle controller 10 and with the mobile terminal 20 are through the so-called mobile telephone network.

The first memory 33 stores the program 33a, the vehicle position information 33h, the mobile-terminal position information 33c, the setting information 33d, a command 33e and map information 33f. As adaptable configurations, the command 33e may be stored in the first memory 33 so as to be read out when needed for execution, or may be executed upon reception without being stored in the first memory 33.

The first memory 33 of the first embodiment is nonvolatile semiconductor memory where reading and writing data are electrically available, and that is capable of keeping data even in power-off state. For example, EEPROM or a flash memory may be used as the first memory 33. However, other memory media or a hard disk drive including a magnetic disk may be used. The program 33a is so-called system software that the controller 31 reads out to execute for controlling the center 30. The map information 33f includes the road information and the facility information around the country or in a predetermined wide area.

The second memory 34 stores identification information 34a. The identification information 34a includes initial data 34b, last data 34c and current data 34d. The initial data 34b is the identification information of the vehicle received for the first time from the vehicle controller 10 after the vehicle controller 10 is installed on the vehicle for the first time. Among the plurality of identification information received from the vehicle controller 10, the updated identification information is the current data 34d, and the identification information received last time is the last data 34c.

The second memory 34 of the first embodiment is nonvolatile semiconductor memory where reading and writing data are electrically available and where the data are deleted when power is disconnected. For example, RAM may be used as the second memory 34.

1-5. Processing on Vehicle Controller

Next, the processing on the vehicle controller 10 is described. Each of FIG. 5, FIG. 6, FIG. 7, FIG. 8 and FIG. 9 shows a flowchart of the processing on the vehicle controller 10.

Figure 5:
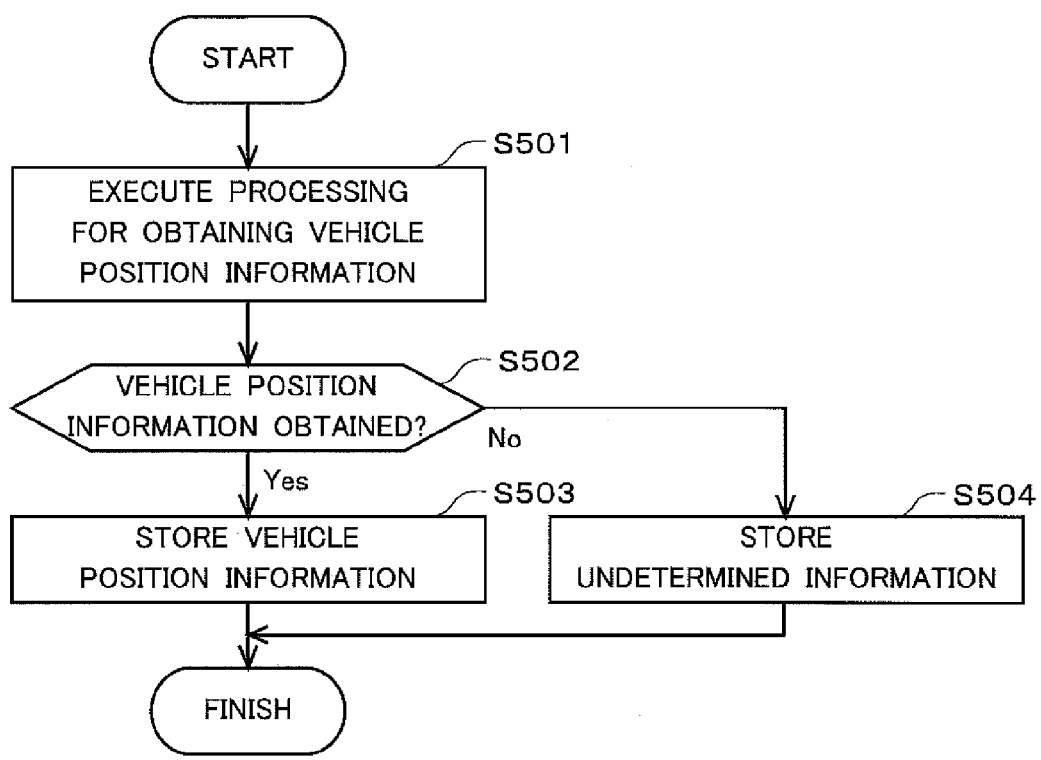
FIG. 5 shows another flowchart of the processing on the vehicle controller.

The vehicle controller 10 obtains the vehicle position information periodically while the ignition switch of the vehicle is in the on-state. Here, described is the processing on the vehicle controller 10 for obtaining the vehicle position information. FIG. 5 shows the flowchart of the processing on the vehicle controller 10 for obtaining the vehicle position information.

First, the position information obtaining part 12 executes the processing for obtaining the vehicle position information, for example, every 50 ms or 100 ms (step S501). After executing the processing for obtaining the vehicle position information, the position information obtaining part 12 judges whether the vehicle position information has been really obtained (step S502). The vehicle position information includes the latitude information and the longitude information. Thus, in an example, when the position information obtaining part 12 has succeeded in appropriately obtaining these of the latitude information and the longitude information, it is judged that the vehicle position information has been obtained. When the position information obtaining part 12 has not succeeded in obtaining them appropriately, it is judged that the vehicle position information has not been obtained.

When judging that the vehicle position information has been obtained (Yes at the step S502), the position information obtaining part 12 stores the obtained vehicle position information in the first memory 14 (step S503). When judging that the vehicle position information has not been obtained (No at the step S502), the position information obtaining part 12 stores the undetermined-information in the first memory 14 (step S504). In this case, the vehicle position information corresponds to the undetermined-information. The vehicle controller 10 repeats the same processing for obtaining the vehicle position information periodically afterward.

Figure 6:
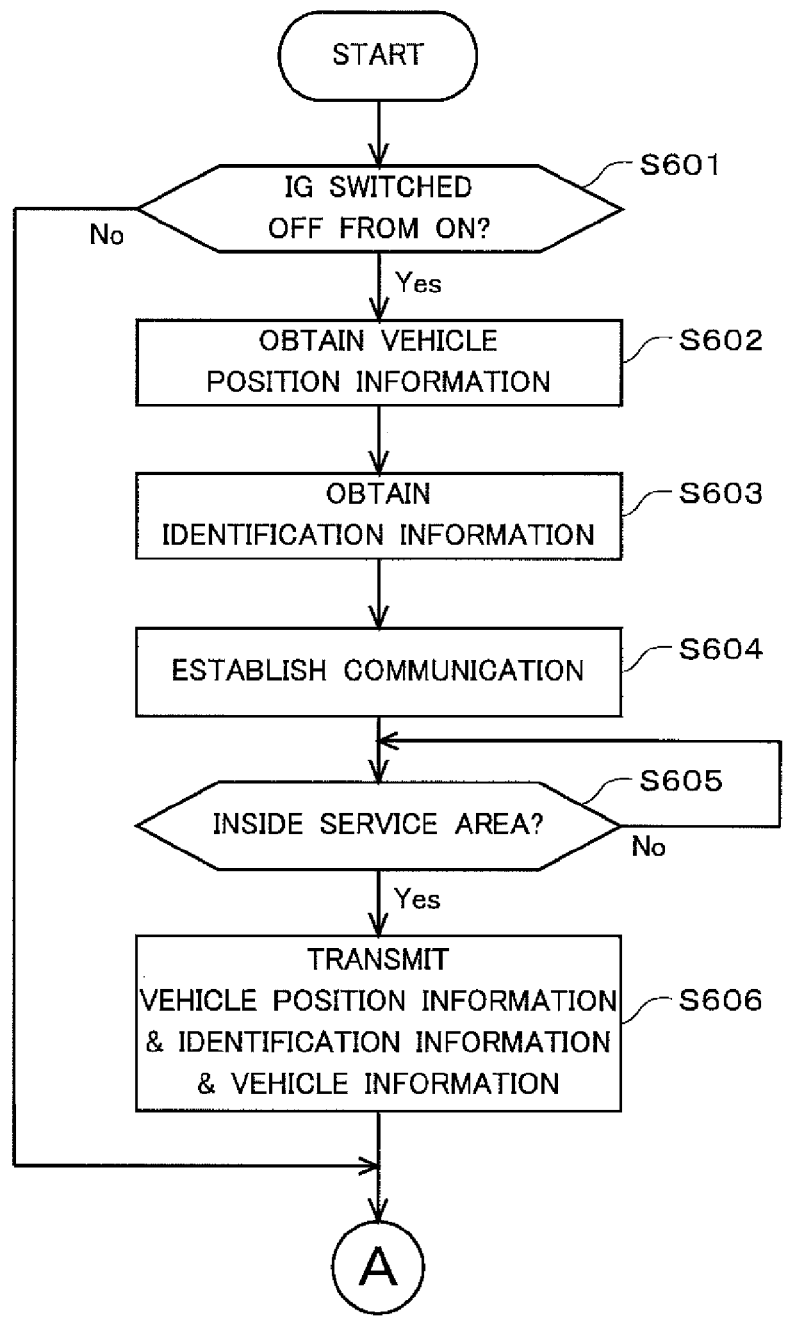
FIG. 6 shows another flowchart of the processing on the vehicle controller.
Figure 7:
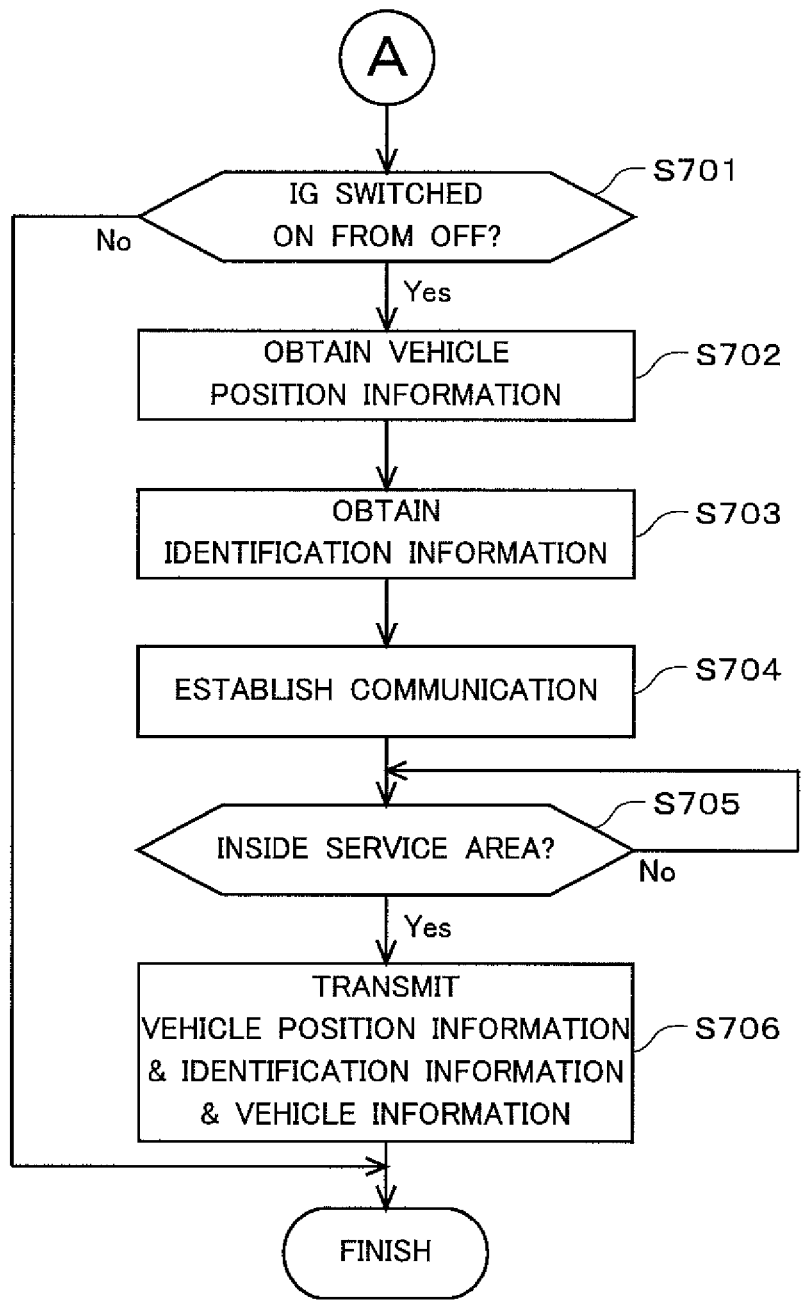
FIG. 7 shows another flowchart of the processing on the vehicle controller.

When the ignition switch is manually switched on or off, the vehicle controller 10 executes the processing for transmitting to the center 30 the vehicle position information, the identification information and the vehicle information. Here, described is the processing on the vehicle controller 10 for transmitting these types of information. Each of FIG. 6 and FIG. 7 shows the flowchart of the processing on the vehicle controller 10 for transmitting these types of information to the center 30. In the figures, the ignition switch is indicated as "IG."

First, the vehicle information obtaining part 11a detects whether the ignition switch has been manually switched off from the on-state (step S601). Concretely, while the ignition switch is in the on-state, upon reception via CAN from a power source ECU, of the signal indicating that the ignition switch is in the off-state, the vehicle information obtaining part 11a detects that the ignition switch has been switched off from the on-state.

When the vehicle information obtaining part 11a does not detect that the ignition switch has been switched off from the on-state (No at the step S601), the procedure moves to the step, described later, for detecting whether the ignition switch has been switched on from the off-state (A in FIG. 6).

When the vehicle information obtaining part 11a detects that the ignition switch has been changed off from the on-state (Yes at the step S601), it is judged that the vehicle is now to be parked. Then, the controller 11 obtains the vehicle position information (step S602). Concretely, the controller 11 obtains the vehicle position information at the time of parking start from the position information obtaining part 12.

Next, the vehicle information obtaining part 11a obtains the identification information (step S603). When the vehicle identification number is used as the identification information, the vehicle information obtaining part 11a obtains this vehicle identification number from the in-vehicle apparatus that has the number. When the wireless ID is used as the identification information, the vehicle information obtaining part 11a obtains the wireless ID from the in-vehicle apparatus that has the number, for example, from the ECU that controls the remote keyless entry system. The vehicle information obtaining part 11a obtains other vehicle information at the time of the vehicle position information obtained, the time of the identification information obtained or around these timings. Then, the procedure moves to the next step where the controller 11 transmits the vehicle position information or other information.

The controller 11 establishes the communication with the center 30 (step S604). Concretely, the controller 11 transmits the command of the request for communication connection to the center 30 via the communicator 13. Upon reception of the command of the request for communication connection, the center 30, if available, permits the communication connection to establish the communication.

However, when the vehicle is parked in the area where the communication is not available, it is impossible to establish the communication at the step S604. Therefore, the communicator 13 judges whether the vehicle is in the service area where the communication with the center 30 is available (step S605). That is, when the communication has been established at the step S604, the communicator 13 judges that the vehicle is in the service area for the communication. When the communication has not been established, the communicator 13 judges that the vehicle is in the out-of-service area for the communication.

When judging that the vehicle is in the service area for the communication (Yes at the step S605), the communicator 13 transmits the vehicle position information, the identification information and the vehicle information to the center 30 (step S606), and the procedure moves to the next step (A in FIG. 6) The vehicle position information to be transmitted is the position information obtained by the position information obtaining part 12 when the ignition switch has been switched off, that is, the parking start position information. The identification information to be transmitted is the identification information obtained by the vehicle information obtaining part 11a when the ignition switch has been switched off. The vehicle information to be transmitted is the vehicle information obtained by the vehicle information obtaining part 11a when the ignition switch has been switched off, and includes the information indicating that the ignition switch is in the off-state. The vehicle information to be transmitted may include the vehicle information that is stored in the first memory 14 but has not been transmitted, in addition to the information indicating that the ignition switch is in the off-state.

When judging that the vehicle is not in the service area for the communication (No at the step S605), the communicator 13 judges once again whether the vehicle is in the service area. This is because the communication conditions may have been temporarily bad due to bad weather or surround constructions. If so, there is a possibility that the communication conditions are improved later. When the vehicle is not in the service area, the communicator 13 can not transmit the vehicle position information and other information to the center 30. Therefore, the controller 11 stores the information to be transmitted in the first memory 14 or in the second memory 15. After it is judged that the vehicle is in the service area when the communication conditions are improved, the controller 11 executes the processing for transmitting to the center 30 via the communicator 13 the vehicle position information, the identification information and other information read out from the first memory 14 or the second memory 15. However, when the communication conditions are changed from the condition of being in the out-of-service area to the condition of being in the service area, the controller 11 may obtain the new vehicle position information. Then, the controller 11 compares the newly-obtained vehicle position information and the vehicle position information obtained at the time when the ignition switch is switched off, which is stored in the first memory 14. When judging that the two of the vehicle position information are identical, the controller 11 may transmit the newly-obtained vehicle position information to the center 30.

Next, the vehicle information obtaining part 11a detects whether the ignition switch has been manually switched on from the off-state (step S701). Concretely, upon reception via the CAN from the power source ECU, of the signal indicating that the ignition switch is in the on-state while the ignition switch is in the off-state, the vehicle information obtaining part 11a detects that the ignition switch has been switched on from the off-state.

When the vehicle information obtaining part 11a does not detect that the ignition switch has been switched on from the off-state (No at the step S701), the procedure is finished without any execution.

When the vehicle information obtaining part 11a detects that the ignition switch has been switched on from the off-state (Yes at the step S701), it is judged that the vehicle is not to be parked any more. Then, the controller 11 obtains the vehicle position information (step S702). Concretely, the controller 11 obtains the vehicle position information at the time of parking end from the position information obtaining part 12. The vehicle information obtaining part 11a obtains the identification information as well (step S703). The processing for obtaining the information is executed in the same manner as the step S603 described above. Then, the procedure moves to the next step where the controller 11 transmits the vehicle position information.

The controller 11 establishes the communication with the center 30 (step S704). Concretely, the controller 11 transmits the command of the request for communication connection to the center 30 via the communicator 13. Upon reception of the command of the request for communication connection, the center 30, if available, permits the communication connection to establish the communication. When the communication with the center 30 has been established already, the step can be omitted.

After the communication is established, the communicator 13 periodically judges whether the vehicle is inside the service area where the communication with the center 30 is available (step S705). That is, in the same manner as the step S605 described above, the communicator 13 judges whether the communication with the center 30 is available by monitoring deterioration of the communication condition after the communication with the center 30 has been established.

When judging that the vehicle is in the service area for the communication (Yes at the step S705), the communicator 13 transmits to the center 30 the vehicle position information, the identification information and the vehicle information (step S706), and the processing is finished. The vehicle position information to be transmitted is the position information obtained by the position information obtaining part 12 when the ignition switch has been switched on, that is, the position information at the time of parking end. The identification information to be transmitted is the identification information obtained by the vehicle information obtaining part 11a when the ignition switch has been switched on. The vehicle information to be transmitted is the vehicle information obtained by the vehicle information obtaining part 11a when the ignition switch has been switched on, and includes the information indicating that the ignition switch is in the on-state. The vehicle information to be transmitted may include the vehicle information that is stored in the first memory 14 but has not been transmitted, in addition to the information indicating that the ignition switch is in the on-state.

When judging that the vehicle is not in the service area for the communication (No at the step S705), the communicator 13 judges once again whether the vehicle is in the service area. When the vehicle is not in the service area, the communicator 13 can not transmit the vehicle position information and other information to the center 30. Therefore, the controller 11 stores the information to be transmitted in the first memory 14 or in the second memory 15. After it is judged that the vehicle is in the service area the controller 11 executes the processing for transmitting to the center 30 via the communicator 13 the vehicle position information, the identification information and other information read out from the first memory 14 or the second memory 15.

As above, when the ignition switch is manually switched on or off, the vehicle controller 10 executes the processing for transmitting to the center 30 the vehicle position information and the identification information obtained at the time when the ignition switch has been switched on or off, in addition to the information indicating that the ignition switch has been switched on or off. The vehicle controller 10 executes the processing shown in FIG. 6 and FIG. 7 periodically, for example, every 50 ms or 100 ms.

Figure 8:
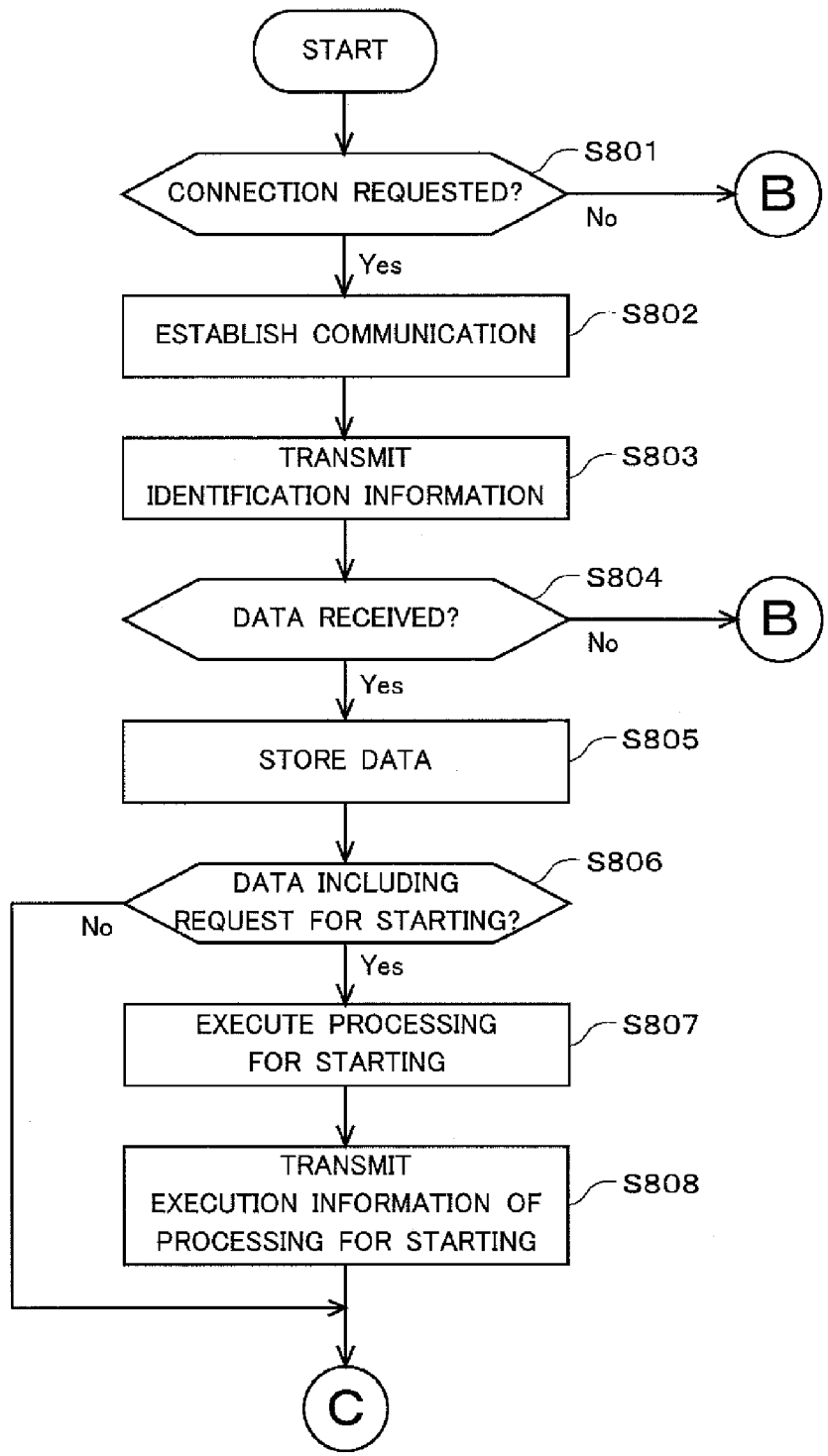
FIG. 8 shows another flowchart of the processing on the vehicle controller.
Figure 9:
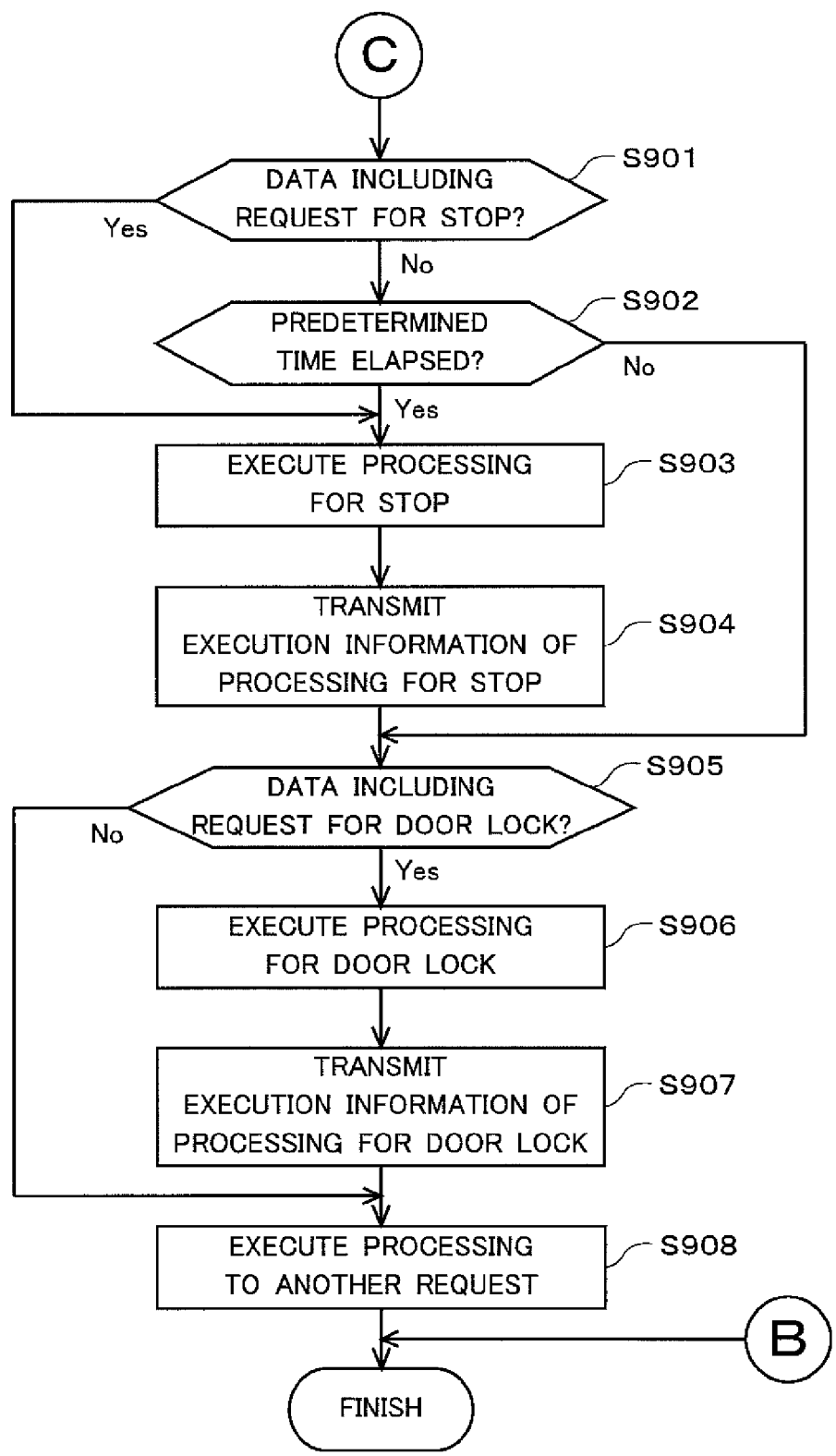
FIG. 9 shows another flowchart of the processing on the vehicle controller.

Described next are the processing for starting and the processing for door lock on the vehicle controller 10. Each of FIG. 8 and FIG. 9 shows the flowchart of the processing for starting and the processing for door lock on the vehicle controller 10.

First, the controller 11 judges whether the communication connection has been requested from the center 30 (step S801). Concretely, the controller 11 judges whether the command of the request for communication connection has been received from the center 30 via the communicator 13. When the controller 11 judges that the request for communication connection has not been received (No at the step S801), the procedure is finished (B in FIG. 8). When judging that the request for communication connection has been received (Yes at the step S801), the controller 11, if available, permits the communication connection to establish the communication (step S802). Since the vehicle controller 10 and the mobile terminal 20 are associated in advance, the center 30 executes the processing for identification by use of the ID, the code or other data that the mobile terminal 20 has, and executes the processing for the communication connection after the associated vehicle controller 10 is identified.

After the communication is established, the controller 11 transmits the identification information to the center 30 (step S803). That is, the vehicle information obtaining part 11a obtains the identification information from the in-vehicle apparatus that has the identification information, and transmits the obtained identification information to the center 30 via the communicator 13.

Next, the controller 11 judges whether any data have been received from the center 30 (step S804). When the controller 11 judges that any data have not been received (No at the step S804), the procedure is finished (B in FIG. 8).

When judging that some data have been received (Yes at the step S804), the controller 11 stores the received data 14d in the first memory 14 (step S805). The controller 11 may store the data 14d in the first memory 14 after the information judging part 11b judges the contents of the data, or may store the data 14d without the judgment. The received data include various kinds of commands, for example, not only the command of the request for door lock and the command of the request for starting, but the command of the request for transmitting the vehicle position information and the vehicle information.

Next, the information judging part 11b judges whether the data received from the center 30 include the command of the request for starting (step S806). The information judging part 11b makes this judgment by judging the contents of the received data. In the case where the contents of the received data have been judged at the time of being stored in the first memory 14, the processing for judging whether the command of the request for starting is stored in the first memory 14 may be executed instead.

When the received data include the command of the request for starting (Yes at the step S806), the starting controller 11c executes the processing for starting the driving apparatus (step S807). Concretely, the starting controller 11c transmits the direction for starting to the power source ECU via the CAN. The power source ECU makes each of an ACC relay, an ignition switch relay and a starter relay be in an on-state, and transmits an ACC signal, an ignition signal and a starter signal to an engine ECU. Upon reception of these signals, the engine ECU starts a starter motor to start an engine. This enables remote control to start the engine.

After transmitting the direction for starting, the starting controller 11c judges whether the processing for starting has succeeded. Then, the starting controller 11c transmits via the communicator 13 to the center 30 the execution result on whether the processing for starting has been succeeded (step S808), and the procedure moves to the next step (C in FIG. 8). That is, when the processing for starting has succeeded, the starting controller 11c transmits the information indicating that the starting has been completed. When the processing for starting has not succeeded, the starting controller 11c transmits the information indicating that the starting has failed.

When the information judging part 11b judges that the data received from the center 30 do not include the command of the request for starting (No at the step S806), the procedure moves to the next step without execution of the processing for starting by the starting controller 11c (C in FIG. 8).

Next, the information judging part 11b judges whether the data received from the center 30 include the command of the request for stopping the driving apparatus (step S901). The information judging part 11b makes this judgment by judging the contents of the received data, as well. When the received data include the command of the request for stop (Yes at the step S901), the starting controller 11c executes the processing for stopping the driving apparatus (step S903). The processing for stop is described later.

When the received data do not include the command of the request for stop (No at the step S901), the timer 11d judges whether the predetermined period of time has elapsed since the starting of the driving apparatus (step S902). That is, the timer 11d starts measuring time from the starting of the driving apparatus, and judges whether the predetermined period of time has elapsed. The predetermined period of time is, for example, a certain amount of elapsed time since the starting of the driving apparatus, that is, a predetermined so-called warming-up time. For example, 10 minutes may be set as the warming-up time. Or, 20 minutes at maximum may be set as the total time of multiple warming-up operations. However, the predetermined period of time is not limited to these above. An appropriate period of time is permitted to be set.

When the timer 11d judges that the predetermined period of time has elapsed since the starting (Yes at the step S902), the starting controller 11c executes the processing for stopping the driving apparatus (step S903). In an example of the processing for stop, the starting controller 11c transmits the signal for stop to the power source ECU via the CAN, and the power source ECU makes each of the ACC relay, the ignition relay and the starter relay be in the off-state to stop the engine drive. This enables remote control to stop the engine.

Then, after executing the processing for stopping the driving apparatus, the starting controller 11c transmits to the center 30 via the communicator 13 the information indicating that the processing for stop has been executed (step S904), and the procedure moves to the next step.

When the timer 11d judges that the predetermined period of time has not elapsed (No at the step S902), the procedure moves to the next step for judging whether the received data include the command of the request for door lock.

Next, the information judging part 11b judges whether the data received from the center 30 include the command of the request for door lock (step S905). The command of the request for door lock in this case is the command of the request for locking doors or the command of the request for unlocking doors. The information judging part 11b makes this judgment by judging the contents of the received data, as well.

When the received data include the command of the request for door lock (Yes at the step S905), the door lock controller 11e executes the processing for locking the doors or the processing for unlocking the doors in accordance with the contents of the command (step S906). After the processing for door lock is finished, the door lock controller 11e transmits via the communicator 13 to the center 30 the execution result regarding the processing for door lock (step S907), and the procedure moves to the next step. That is, when having executed the processing for door lock, the door lock controller 11e transmits the information indicating that the doors have been locked or unlocked. When having failed to execute the processing for door lock for some reason, the door lock controller 11e transmits the information indicating the failure of the processing for locking the doors or the processing for unlocking the doors.

When the information judging part 11b judges that the data received from the center 30 do not include the command of the request for door lock (No at the step S905), the procedure moves to the next step without execution of the processing for door lock by the door lock controller 11e.

Next, the controller 11 executes the processing to respond to another request (step S908). The processing to respond to another request is the processing corresponding to another command received when the received data include the command other than the commands of the request for starting and the request for door lock (hereafter, referred to as "another command").

That is, the information judging part 11b judges whether the received data include another command. The controller 11 executes the processing corresponding to the command, if any. In an example, when the received data include the command of the request for transmitting the vehicle information, the controller 11 executes the processing for transmitting the requested vehicle information to the center 30 via the communicator 13. When the information judging part 11b judges that the received data do not include any other command, there is nothing to be done at this step. Then, the processing on the vehicle controller 10 is finished.

After the communication with the center 30 is established, the center 30 may terminate the communication, or the vehicle controller 10 may terminate the communication.

1-6. Processing on Mobile Terminal

Figure 10:
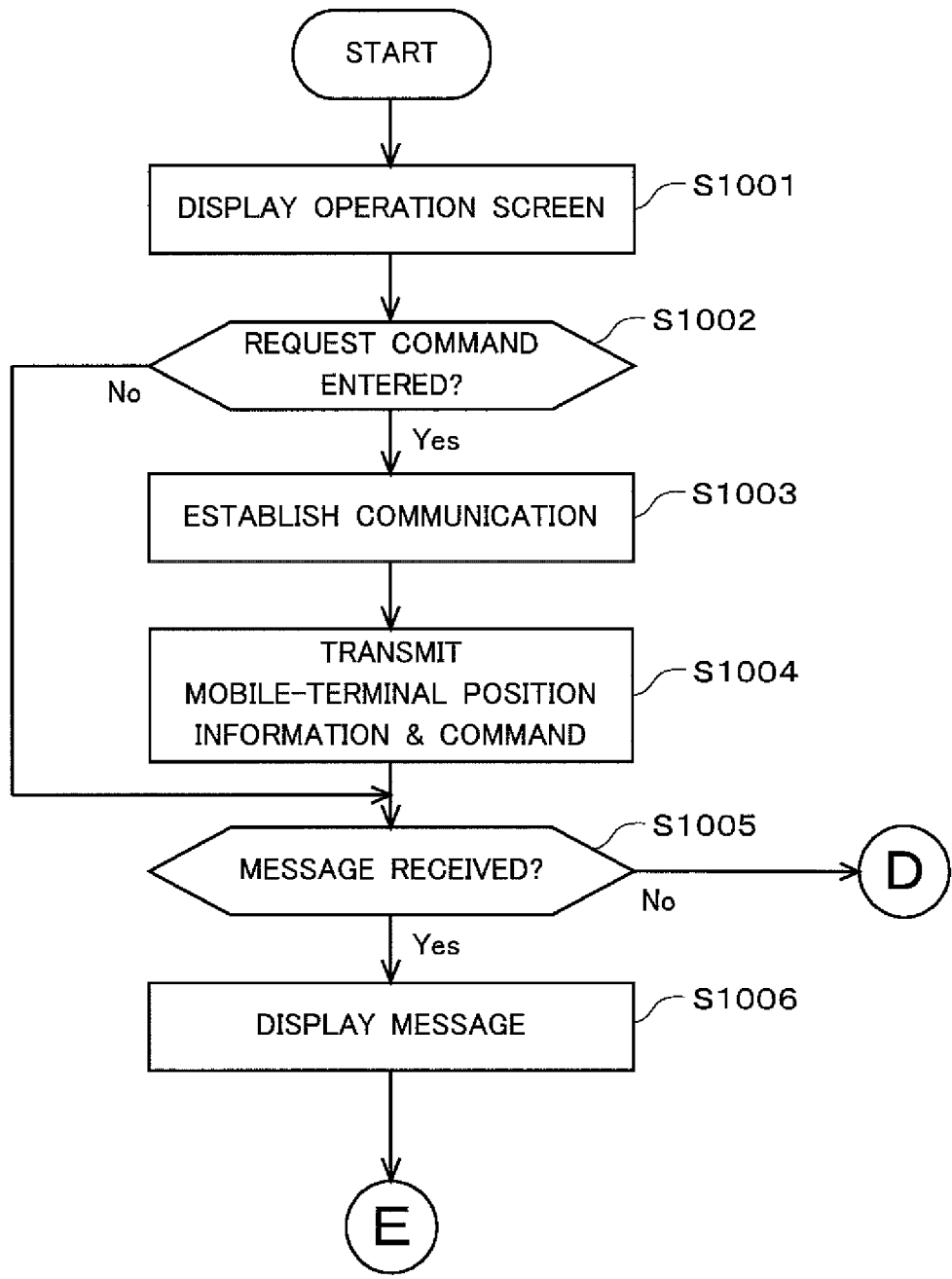
FIG. 10 shows another flowchart of the processing on the mobile terminal.
Figure 11:
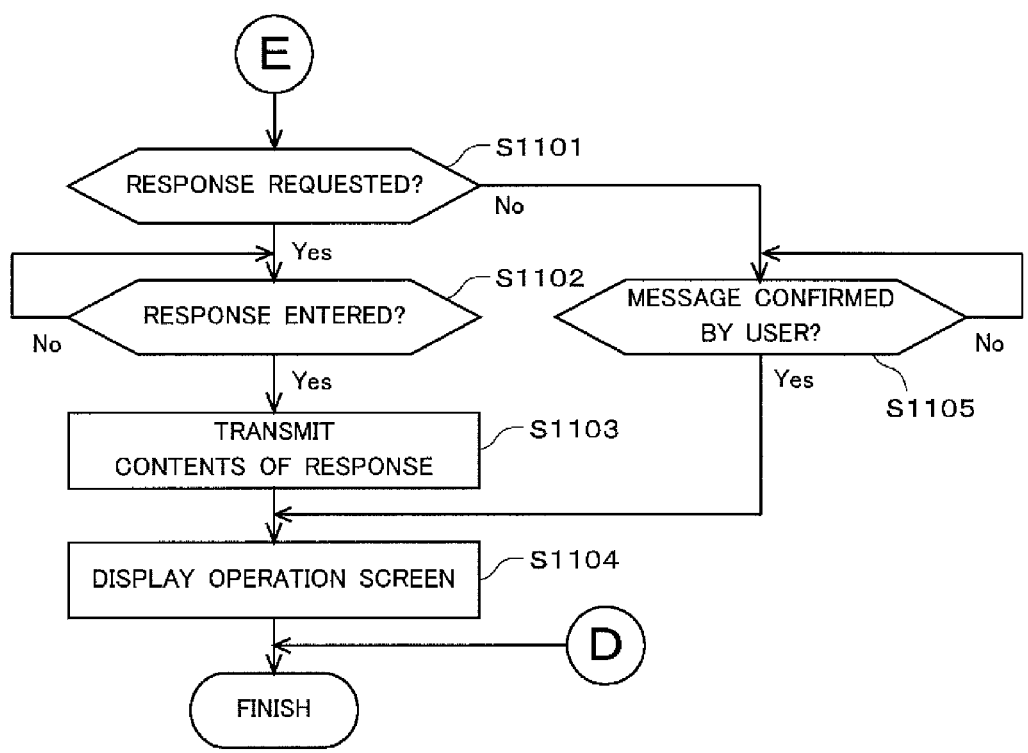
FIG. 11 shows another flowchart of the processing on the mobile terminal.
Figure 12:
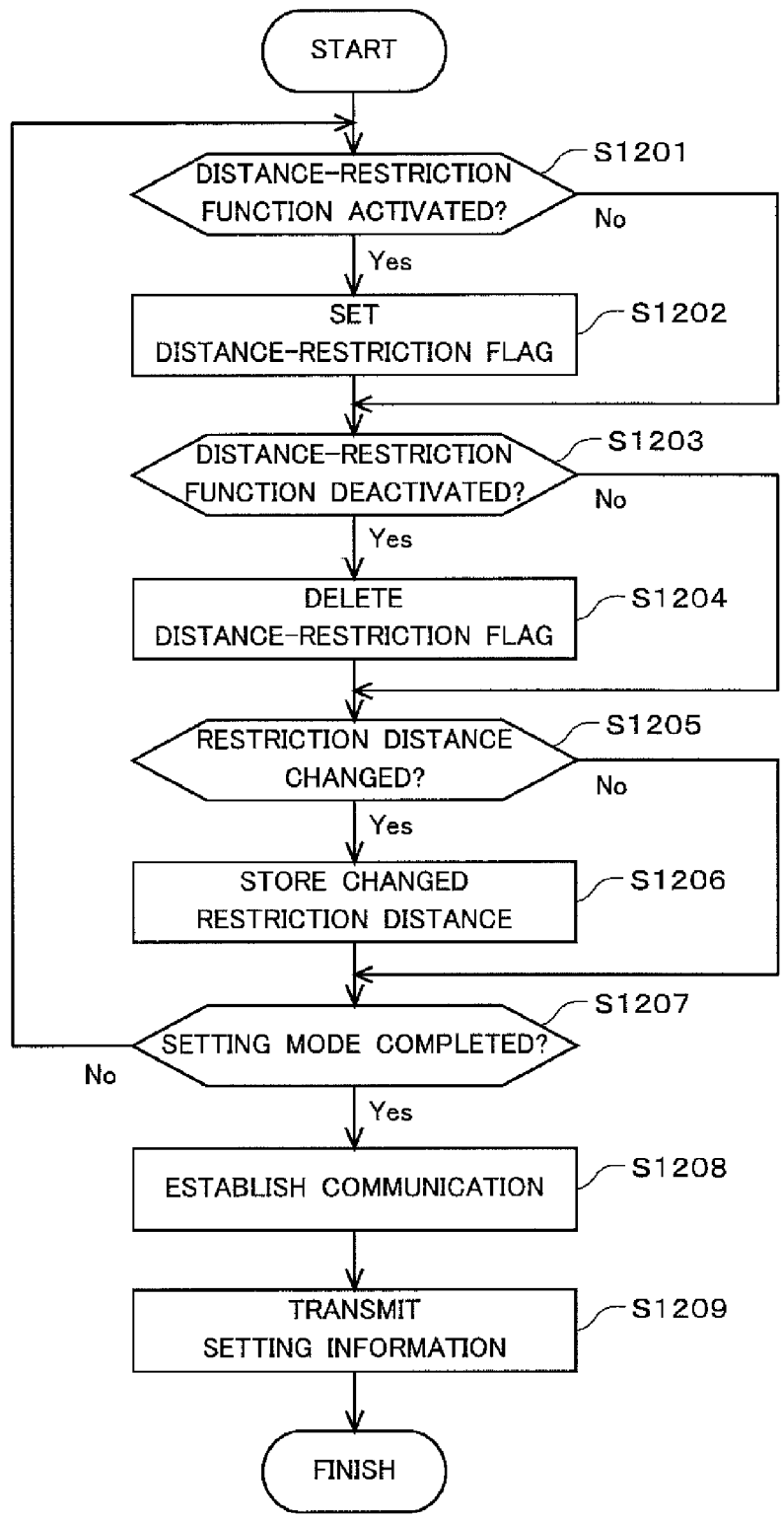
FIG. 12 shows another flowchart of the processing on the mobile terminal.

Next, the processing on the mobile terminal 20 is described. Each of FIG. 10, FIG. 11, and FIG. 12 shows a flowchart of the processing on the mobile terminal 20. Described first is the processing for controlling the vehicle from a distance by use of the mobile terminal 20, such as the processing for the request for door lock or the processing for the request for starting. Each of FIG. 10 and FIG. 11 shows the flowchart of the processing on the mobile terminal 20.

The processing on the mobile terminal 20 starts with running the application 24d for remote operation stored in the mobile terminal 20. After the application 24d of the mobile terminal 20 is run, a main operation screen for remote operation is displayed on the display 25 (step S1001). The display controller 21b displays the operation screen on the display 25 by reading out the operation screen stored in the application 24d.

Next, the controller 21 judges whether the command of a request to the center 30 has been entered by the user on the displayed operation screen (step S1002). When judging that the request command has been entered (Yes at the step S1002), the controller 21 establishes the communication with the center 30 (step S1003). Concretely, the controller 21 transmits the command of the request for communication connection to the center 30 via the communicator 23. Upon reception of the command of the request for communication connection, the center 30, if available, permits the communication connection to establish the communication.

Next, the controller 21 transmits the request command to the center 30 via the communicator 23 (step S1004). When the request command is entered, the information judging part 21a judges the contents of the entered command. The command to be entered is, for example, the command of the request for locking doors or unlocking doors, or of the request for starting or stopping the driving apparatus. Prior to transmission of the entered request command, the position information obtaining part 22 obtains the position information of the mobile terminal 20. Then, the controller 21 transmits the obtained mobile-terminal position information besides the entered request command.

When the controller 21 judges that the request command has not been entered (No at the step S1002), the procedure moves to the next step without execution of the processing for transmitting the request command or others.

Next, the controller 21 judges whether a message has been received from the center 30 (step S1005). The judgment made by the controller 21 includes the judgment on whether any data have been received from the center 30, and whether the received data, if any, correspond to a message. Concretely, the information judging part 21a makes this judgment on whether the received data correspond to a message. The message to be received from the center 30 is, for example, a confirmation message relevant to continuation of the processing for remote starting, or a response message to the information requested by the user to the center 30. The concrete examples of the message are the confirmation message for confirming whether to continue the starting in the case where the restriction conditions for the restriction function are not satisfied, and the message for transmitting the contents of the vehicle information that has been inquired by the user to the center 30.

When the controller 21 judges that the message has not been received (No at the step S1005), the processing is finished without execution of the following steps (I) in FIG. 10). When judging that the message has been received (Yes at the step S1005), the controller 21 displays the message on the display 25 (step S1006). Then the procedure moves to the next step (E in FIG. 10).

The information judging part 21*a* judges whether the received message is for requesting user's response (step S1101). The message for requesting user's response is, in the examples described above, the confirmation message for confirming whether to continue the starting. The message not for requesting user's response is the message for transmitting the contents of the vehicle information.

When the information judging part 21*a* judges that the received message is for requesting user's response (Yes at the step S1101), the controller 21 monitors whether the user's response has been entered (step S1102). The response is entered when the user makes operations on the operation screen. The step for monitoring the user's response is repeated until when it is judged that the response has been entered (No at the step S1102).

When judging that the response has been entered (Yes at the step S1102), the controller 21 transmits the contents of the response to the center via the communicator 23 (step S1103). Then, the controller 21 redisplays the operation screen on the display (step S1104).

When the information judging part 21*a* judges that the received message is not for requesting the user's response at the step for judging the existence of the response request (No at the step S1101), the controller 21 monitors whether the user has confirmed the displayed message (step S1105). The message not for requesting the user's response is only for presenting the contents to the user. Thus, the controller 21 monitors simply whether the user has confirmed the message. However, the step for monitoring may be omitted, if not needed.

The controller 21 repeats the step for monitoring until it is judged that the user has confirmed the message (No at the step S1105). When judging that the user has confirmed the message (Yes at the step S1105), the controller 21 redisplays the operation screen on the display (step S1104). In an example, the user touches a confirmation button on the operation screen to express confirmation of the message. In this case, the controller 21 judges whether the message has been confirmed by judging whether the confirmation button has been touched.

Later, the user can execute again the processing for remote operation by re-executing the processing from the start. The processing for remote operation is finished when the user shuts down the application 24*d* for remote controlling.

The communication with the center 30 is terminated not just when the application 24*d* for remote controlling is shut down, but is automatically terminated when transmitting necessary data to and receiving necessary data from the center 30 are completed. That is, after the controller 21 has established the communication at the step S1003, the communication is automatically terminated in the case where it is judged that a series of responses from the center in terms of the request command transmitted at the step S1004 have been completed. The case where the responses from the center 30 have been completed is the case such as when the time information at the time of starting has been received or when the message not for requesting the user's response has been received.

Described next is the processing for setting the restriction function and for changing the restriction conditions by use of the mobile terminal 20. FIG. 12 shows the flowchart of the processing for setting the restriction function and for changing the restriction conditions in the case where the distance-restriction function is adopted as the restriction function.

The processing for setting the restriction function and for changing the restriction conditions starts when the user selects the setting mode of the mobile terminal 20. When the setting mode is selected, the restriction function setting part 21*c* judges whether the distance-restriction function of the mobile terminal 20 is activated (step S1201). When the distance-restriction function is activated (Yes at the step S1201), the restriction function setting part 21*c* sets the flag indicating that the distance-restriction function is activated (step S1202). When the distance-restriction function is not activated (No at the step S1201), the flag is not set.

Next, the restriction function setting part 21*c* judges whether the distance-restriction function is deactivated (step S1203). When the distance-restriction function is deactivated (Yes at the step S1203), the restriction function setting part 21*c* deletes the flag that activates the distance-restriction function (step S1204). When the distance-restriction function is not deactivated (No at the step S1203), the flag is not deleted.

Next, the restriction function setting part 21*c* judges whether the restriction distance, one of the restriction conditions, has been changed (step S1205). Upon the change of the restriction distance (Yes at the step S1205), the restriction function setting part 21*c* stores the changed restriction distance in the memory 24 (step S1206). When the restriction distance is not changed (No at the step S1205), the processing for changing the restriction conditions is not executed.

Next, the restriction function setting part 21*c* judges whether the setting mode has been finished (step S1207). When the restriction function setting part 21*c* judges that the setting mode has been finished (Yes at the step S1207), the controller 21 establishes the communication with the center 30 (step S1208). The communication can be established in the same manner as the steps described above. When the communication with the center 30 has been established already, this step may be omitted.

Then, the controller 21 transmits to the center 30 via the communicator 23 the setting information 24*c* read out from the memory 24 after the processing for setting is finished (step S1209), and then, the processing for setting the restriction function and the processing for changing the restriction conditions are finished. When judging that the setting mode has not been finished (No at the step S1207), the restriction function setting part 21*c* re-executes the procedure starting from the step for judging whether the distance-restriction function is activated (step S1201).

1-7. Processing on Center

Next, the processing on the center 30 is described. Each of FIG. 13, FIG. 14, FIG. 15, FIG. 16 and FIG. 17 shows a flowchart of the processing on the center 30. Described is the processing on the center 30 for executing door lock and starting by transmitting information to and receiving information from the vehicle controller 10 and the mobile terminal 20, in reference to FIGS. 13, 14, 15, 16 and 17.

The center 30 judges whether the communication connection has been requested from the vehicle controller 10 (step 1301). Concretely, the controller 31 judges whether the command of the request for communication connection has been received from the vehicle controller 10. When judging that the request for communication connection has been received from the vehicle controller 10 (Yes at the step S1301), the controller 31, if available, permits the communication connection with the vehicle controller 10 to establish the communication (step S1302). When the controller 31 judges that the request for communication connection has not been received from the vehicle controller 10 (No at the step S1301), the procedure moves to the next step without execution of the processing for establishing the communication (F in FIG. 13).

Next, the controller 31 judges whether any data have been received from the vehicle controller 10 (step S1303). Concretely, the controller 31 judges whether any data have been received via the communicator 32, or whether the sender of the data, if any, is the vehicle controller 10.

When judging that some data have been received from the vehicle controller 10 (Yes at the step S1303), the controller 31 stores the received data in the first memory 33 or the second memory 34 (step S1304). When the controller 31 judges that any data have not been received from the vehicle controller 10 (No at the step S1303), the procedure moves to the next step for terminating the communication without execution of the processing.

Then, the information judging part 31a judges whether the received data include the vehicle position information 33b obtained at the time when the ignition switch has been switched off, that is, the vehicle position information at the time of parking start (step S1305).

When the information judging part 31a judges that the received data include the vehicle position information 33b obtained at the time when the ignition switch has been switched off (Yes at the step S1305), the controller 31 stores in the first memory 33 the vehicle position information 33b as "the vehicle position information 33b at the time of the ignition switch switched off," that is, as the parking start position (step S1306). When the undetermined-information corresponds to the received data, the undetermined-information is stored in the first memory 33 as "the vehicle position information 33b at the time of the ignition switch switched off."

When the information judging part 31a judges that the received data do not include the vehicle position information 33b at the time of the ignition switch switched off (No at the step S1305), the processing is not executed.

Next, the information judging part 31a judges whether the received data include the identification information (step S1307). When the information judging part 31a judges that the received data include the identification information 34a, the controller 31 stores the identification information 34a in the second memory 34 (step S1308). The identification information 34a transmitted by the vehicle controller 10 is associated with the vehicle controller 10. That is, the identification information 34a for each of the vehicle controller 10 is stored in the second memory 34.

Upon reception of the identification information 34a, the information judging part 31a judges whether the received identification information 34a corresponds to the initial data 34b. When the identification information 34a associated with the vehicle controller 10 of the sender is not stored at all in the second memory 34, the information judging part 31a judges that the received identification information 34a corresponds to the initial data 34b. The identification information 34a judged as the initial data 34b is stored as the initial data 34b in the second memory 34.

Upon reception of the identification information 34a, the controller 31 stores the received identification information 34a as the current data 34d in the second memory 34. When being judged as the initial data 34b, the identification information 34a is stored both as the initial data 34b and as the current data 34d. When being judged not as the initial data 34b, the identification information 34a is stored only as the current data 34d. That is, the current data 34d is the identification information 34a lastly received by the center 30.

Prior to storing the received identification information 34a as the current data 34d, the controller 31 stores the identification information that has been stored as the current data 34d, newly as the last data 34c. That is, the last data 34c is the identification information 34a that the center 30 has received at the previous time as the updated identification information 34a.

When the information judging part 31a judges that the received data do not include the identification information (No at the step S1307), the procedure moves to the next step for terminating the communication without execution of the processing. Next, the controller 31 terminates the communication with the vehicle controller 10 (step S1309), and the procedure moves to the next step (F in FIG. 13).

Next, the center 30 judges whether the communication connection has been requested from the mobile terminal 20 (step 1401). Concretely, the controller 31 judges whether the command of the request for communication connection has been received from the mobile terminal 20. When judging that the request for communication connection has been received from the mobile terminal 20 (Yes at the step S1401), the controller 31, if available, permits the communication connection with the mobile terminal 20 to establish the communication (step S1402). When the controller 31 judges that the request for communication connection has not been received from the mobile terminal 20 (No at the step S1401), the procedure is finished without execution of the step for establishing the communication (G in FIG. 14).

Next, the controller 31 judges whether any data have been received from the mobile terminal 20 (step S1403). Concretely, the controller 31 judges whether any data have been received via the communicator 32, or whether the sender of the data, if any, is the mobile terminal 20.

When judging that some data have been received from the mobile terminal 20 (Yes at the step S1403), the controller 31 stores the received data in the first memory 33 (step S1404). The received data include the mobile-terminal position information. When the controller 31 judges that any data have not been received from the mobile terminal 20 (No at the step S1403), the procedure moves to the next step for terminating the communication without execution of the processing corresponding to the judgment (H in FIG. 14).

After the data received from the mobile terminal 20 are stored, the information judging part 31a judges whether the received data include the command 33e of the request for starting (step S1405). When the information judging part 31a judges that the received data include the command 33e of the request for starting (Yes at the step S1405), the controller 31 executes the processing for transmitting the request for starting the driving apparatus (step S1406). When the information judging part 31a judges that the received data do not include the command 33e of the request for starting (No at the step S1405), the procedure moves to the next step without execution of the processing for transmitting the request for starting the driving apparatus (I in FIG. 14).

Figure 16:
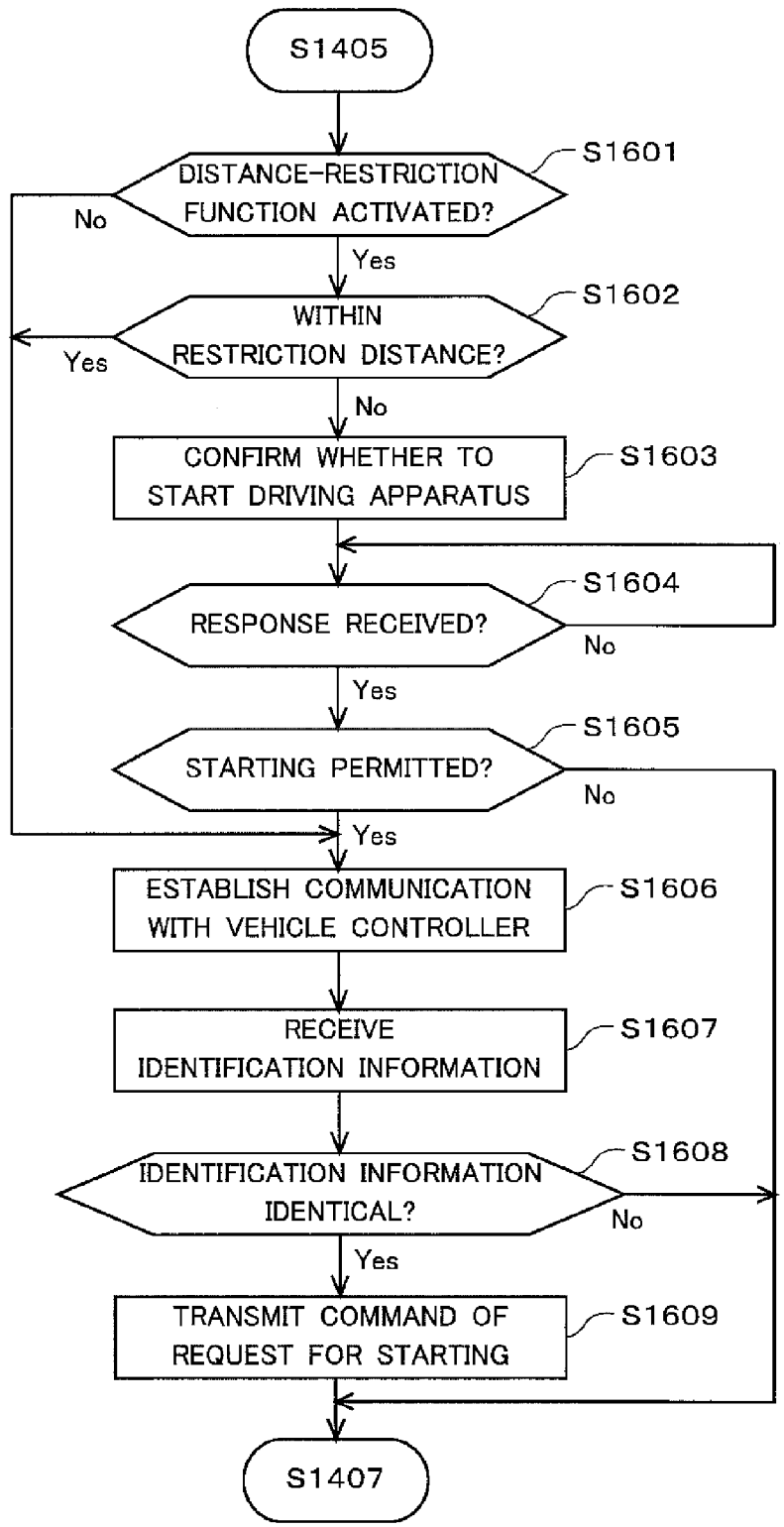
FIG. 16 shows another flowchart of the processing on the center.

Described next is the processing for transmitting the request for starting executed by the controller 31 (step S1406). FIG. 16 is the flowchart of the processing for transmitting the request for starting.

When the information judging part 31a judges that the received data include the command 33e of the request for starting, the starting restricting part 31b judges whether the distance-restriction function is activated (step S1601). In the setting information 33d stored in the first memory 33 of the center 30, the distance-restriction function is activated initially. However, when the distance-restriction function is activated or deactivated on the mobile terminal 20, and when such information is transmitted as the setting information to the center 30, the setting information 33d is rewritten to the newly transmitted setting information. The starting restricting part 31b can judge whether the distance-restriction function is activated or deactivated in reference to the stored setting information 33d.

When the starting restricting part 31b judges that the distance-restriction function is not activated (No at the step S1601), there is no distance restriction. Thus, the procedure moves to the step for establishing the communication with the vehicle controller 10 (step S1606). When judging that the distance-restriction function is activated (Yes at the step S1601), the starting restricting part 31b judges whether the distance between the position of the mobile terminal 20 and the vehicle position is equal to or shorter than the restriction distance (step S1602). Concretely, the starting restricting part 31b calculates the distance between the position of the mobile terminal 20 and the vehicle position by comparing the mobile-terminal position information 33c at the time of the request for starting and the vehicle position information 33b at the time of the ignition switch switched off (at the time of parking start) that are stored in the first memory 33. Then, the starting restricting part 31b compares the calculated distance and the restriction distance read out from the setting information 33d that has been stored in the first memory 33.

When the starting restricting part 31b judges that the calculated distance is equal to or shorter than the restriction distance as a result of the comparison (Yes at the step 1602), the procedure moves to the step for establishing the communication with the vehicle controller 10 (step S1606). When the starting restricting part 31b judges that the calculated distance is longer than the restriction distance (No at the step S1602), the procedure moves to the step for confirming whether to continue the processing for starting (step S1603). Concretely, the controller 31 transmits to the mobile terminal 20 via the communicator 32 the information indicating that the distance between the position of the mobile terminal 20 at the time of the request for starting and the vehicle position at the time of parking start is longer than the restriction distance, and the inquiry information for confirmation on whether to continue the processing for starting.

Then, the controller 31 monitors whether the response to the inquiry has been received from the mobile terminal 20 (step S1604). When judging that the response has not been received from the mobile terminal 20 (No at the step S1604), the controller 31 repeats the step for the monitoring until receiving the response. When judging that the response has been received from the mobile terminal 20 (Yes at the step S1604), the controller 31 judges whether the contents of the response indicate that continuing the processing for starting is permitted (step S1605).

When judging that the contents of the response from the mobile terminal 20 indicate that continuing the processing for starting is permitted (Yes at the step S1605), the controller 31 executes the processing for establishing the communication with the vehicle controller 10 (step S1606). When the controller 31 judges that the contents of the response from the mobile terminal 20 indicate that continuing the processing for starting is not permitted (No at the step S1605), the procedure is finished without execution of the processing for transmitting the request for starting.

After the communication with the vehicle controller 10 is established, the controller 31 receives the identification information from the vehicle controller 10 (step S1607). The identification information is stored in the second memory 34 as the current data 34d.

Then, the match judging part 31c judges whether the plurality of identification information received from the vehicle controller 10 are identical (step S1608). Concretely, the match judging part 31c reads out the initial data 34b and the current data 34d stored in the second memory 34, and compares the two. When the two of the data are the same, the two of the identification information are judged as identical. When the two of the data are different, the two of the identification information are judged as not identical. The identification information is specific to each vehicle. Thus, judging whether the two of the identification information are identical corresponds to the judgment on whether the vehicle controller 10 has not been installed on another vehicle.

When the two of the identification information are identical (Yes at the step S1608), the controller 31 transmits the command of the request for starting to the vehicle controller 10 (step S1609). The judgment that the two of the identification information are identical indicates that the vehicle is equipped with the same vehicle controller 10. This means, it is unlikely that the vehicle controller 10 is installed on a stranger's vehicle. Therefore, it is judged that the vehicle controller 10 belongs to the proper user, and the controller 31 permits the request for starting.

When the two of the identification information are not identical (No at the step S1608), the controller 31 does not transmit the command of the request for starting to the vehicle controller 10, and the procedure moves to step S1407. That is, in this case, it is highly possible that the vehicle controller 10 is installed on a stranger's vehicle. Therefore, it is judged that the vehicle controller 10 on the vehicle does not belong to the proper user, and the controller 31 does not permit the request for starting.

Judgment on whether the two of the identification information are identical is not made only by comparison between the initial data 34b and the current data 34d. In an example, the last data 34c and the current data 34d may be compared, or all of these data may be compared. That is, the match judging part 31c has only to judge whether the updated identification information and the previous identification information are identical.

When judging that the calculated distance is longer than the restriction distance, the controller 31 may cancel the processing for transmitting the request for starting without confirming whether to continue the processing for starting. In this case, when No is obtained at the step S1602, the processing for transmitting the request for starting is finished.

Figure 14:
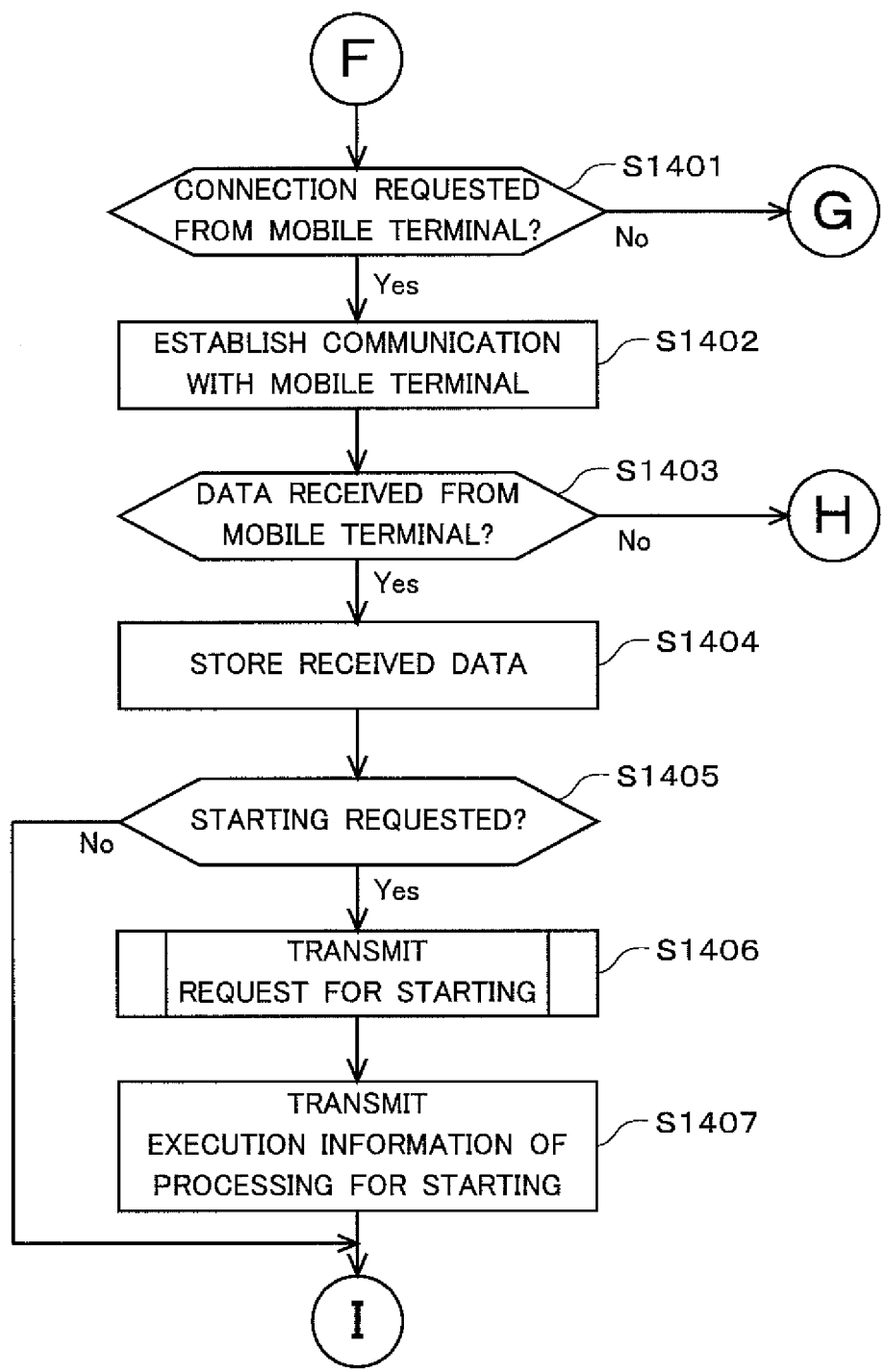
FIG. 14 shows another flowchart of the processing on the center.

The procedure is back to the step S1407 in FIG. 14 where the controller 31 transmits to the mobile terminal 20 the information indicating execution results of the processing for starting, and then moves to the next step (I in FIG. 14). Concretely, the controller 31 transmits the information indicating that the driving apparatus has been started successfully, when transmitting the command of the request for starting to the vehicle controller 10, or when receiving from the vehicle controller 10 the information indicating that the driving apparatus has been successfully started. Or, the controller 31 transmits the information indicating failure in starting the driving apparatus, when not executing the processing for transmitting the command of the request for starting because the starting has not been permitted at the step S1605, when the plurality of identification information are not identical at the step S1608, or when receiving from the vehicle controller 10 the information indicating the failure in the starting.

Next, the information judging part 31*a* judges whether the received data include the command of the request for door lock (step S1501). When the information judging part 31*a* judges that the received data include the command of the request for door lock (Yes at the step S1501), the controller 31 executes the processing for transmitting the request for door lock (step S1502). When the information judging part 31*a* judges that the received data do not include the command of the request for door lock (No at the step S1501), the procedure moves to the next step without execution of the processing for transmitting the request for door lock.

Figure 17:
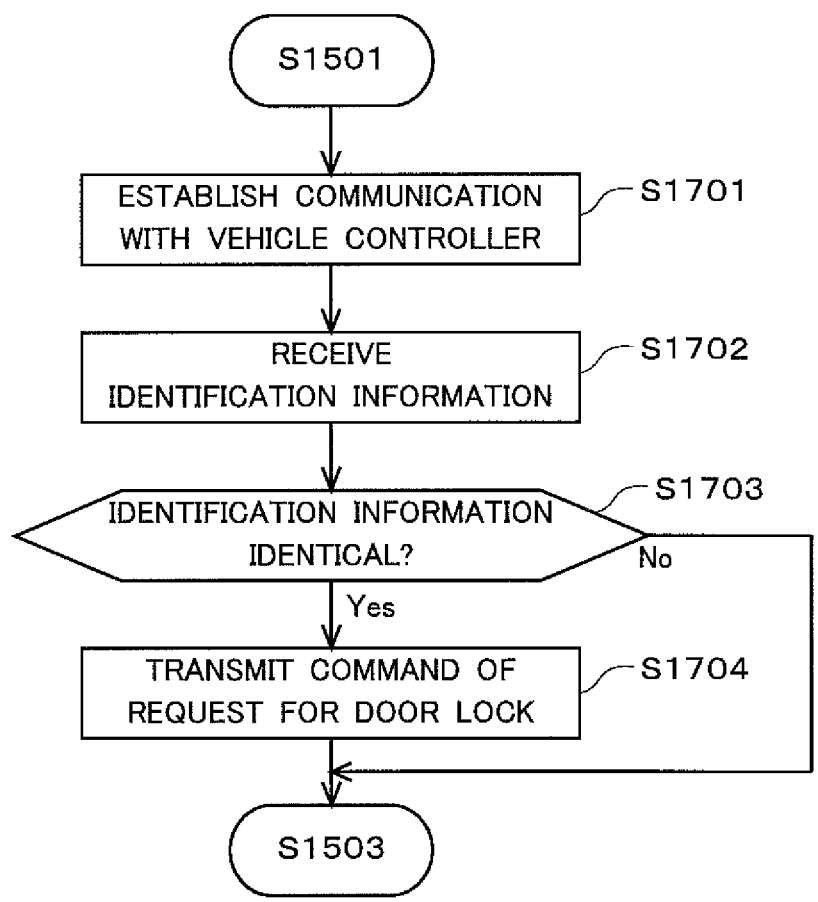
FIG. 17 shows another flowchart of the processing on the center.

Described next is the processing for transmitting the request for door lock to be executed by the controller 31 (step S1502). FIG. 17 is the flowchart of the processing for transmitting the request for door lock.

The controller 31 transmits the command of the request for communication connection to the vehicle controller 10 via the communicator 32, and establishes the communication with the vehicle controller 10 (step S1701). When the communication with the vehicle controller 10 has been established already, this step can be omitted.

After the communication with the vehicle controller 10 is established, the controller 31 receives the identification information from the vehicle controller 10 (step S1702). The step is executed in the same manner as the step S1607. When the identification information has been received already at the step S1607, this step may be omitted. The received identification information is stored in the second memory 34 as the current data 34*d*.

Then, the match judging part 31*c* judges whether the plurality of identification information received from the vehicle controller 10 are identical (step S1703). The step can be executed in the same manner as the step S1608. When the plurality of identification information are identical (Yes at the step S1703), the controller 31 transmits the command of the request for door lock to the vehicle controller 10 (step S1704). The judgment that the plurality of identification information are identical indicates that the vehicle is equipped with the same vehicle controller 10, as described above. This means, it is unlikely that the vehicle controller 10 is installed on a stranger's vehicle. Therefore, it is judged that the vehicle controller 10 belongs to the proper user, and the controller 31 permits the request for door lock.

When the plurality of identification information are not identical (No at the step S1703), the controller 31 does not transmit the command of the request for door lock to the vehicle controller 10, and the procedure moves to the step S1503. That is, in this case also, it is highly possible that the vehicle controller 10 is installed on a stranger's vehicle, as described above. Therefore, since it is judged that the vehicle controller 10 on the vehicle does not belong to the proper user, the controller 31 does not permit the request for door lock.

Figure 15:
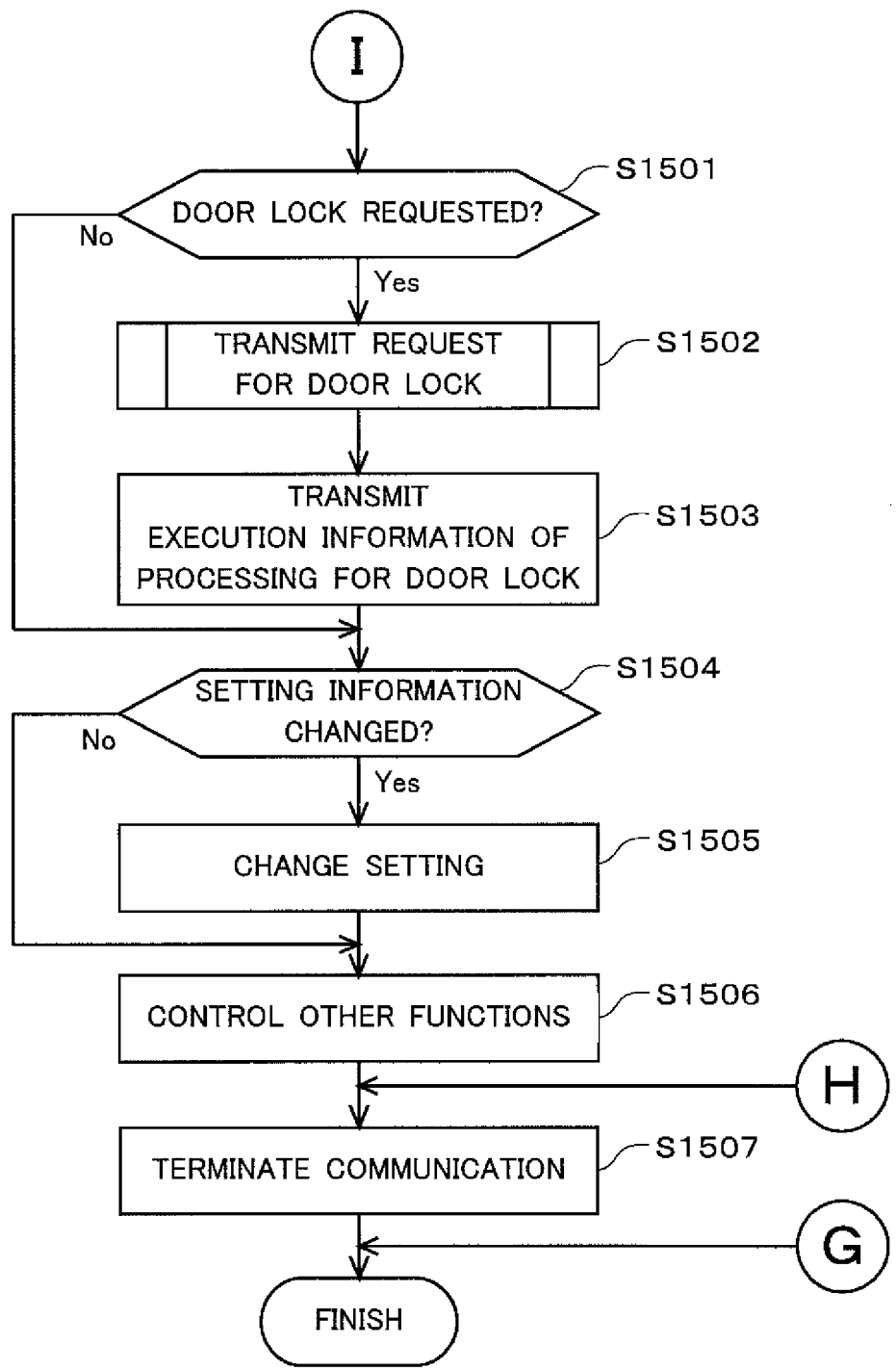
FIG. 15 shows another flowchart of the processing on the center.

The procedure is back to the step S1503 in FIG. 15 where the controller 31 transmits to the mobile terminal 20 the information indicating the execution result of the processing for door lock, and then moves to the next step. Concretely, the controller 31 transmits the information indicating that the processing for door lock has been executed, when transmitting the command of the request for door lock to the vehicle controller 10, or when receiving from the vehicle controller 10 the information indicating that the processing for door lock has been executed. The controller 31 transmits the information indicating the failure in the processing for door lock, when the plurality of identification information are not identical at the step S1703, or when receiving from the vehicle controller 10 the information indicating the failure in the processing for door lock.

Next, the information judging part 31*a* judges whether the received data include the data for changing the setting information 33*d* (step S1504). When the information judging part 31*a* judges that the received data include the data for changing the setting information 33*d* (Yes at the step S1504), the controller 31 changes the setting information 33*d* based on the received data, and stores the changed setting information 33*d* in the first memory 33 (step S1505). That is, the controller 31 executes the processing for rewriting the setting information 33*d* stored in the first memory 33 so as to change the setting information 33*d* to the contents after change. When the information judging part 31*a* judges that the received data do not include the data for changing the setting information 33*d* (No at the step S1504), the procedure moves to the next step without execution of the processing for changing the setting.

Next, the controller 31 executes control of other functions (step S1506). Concretely, the information judging part 31*a* first judges whether the received data include another command 33*e*. When the information judging part 31*a* judges that the received data include another command 33*e*, the controller 31 executes the processing corresponding to command 33*e*. When the information judging part 31*a* judges that the received data do not include another command 33*e*, the controller 31 does not execute any other processing.

Then, when the communications with the vehicle controller 10 and with the mobile terminal 20 have been established, the controller 31 executes the processing for terminating the communications with the both (step S1507), the processing on the center 30 is finished.

As described above, in the first embodiment, the center 30 judges whether the updated identification information and the previous identification information are identical, and transmits the command of the request for starting or for door lock based on the result. Thus, when the vehicle controller 10 does not belong to the proper user, it becomes possible to prevent such a command to be executed.

2. Second Embodiment

Next, the second embodiment is described. In the configuration of the first embodiment, when judging that the plurality of identification information are identical through comparison, the center 30 transmits the command of the request for door lock or the request for starting. In the configuration of the second embodiment, the vehicle controller 10 judges whether the plurality of identification information are identical. Described hereinafter are mainly the different points from the first embodiment.

<2-1. Outline of System>

The outline of a vehicle control system 100 of the second embodiment has the same configuration as the vehicle control system 100 shown in FIG. 1. The configuration and the processing of a mobile terminal 20 of the second embodiment are the same as those of the first embodiment. In the second embodiment, a part of the configuration of and the processing on a vehicle controller 10, and a part of the configuration of and the processing on a center 30 are different from those of the first embodiment. Thus, described hereafter are mainly the different points from the first embodiment regarding the configuration of and the processing of the vehicle controller 10, and the configuration of and the processing of the center 30.

Figure 18:
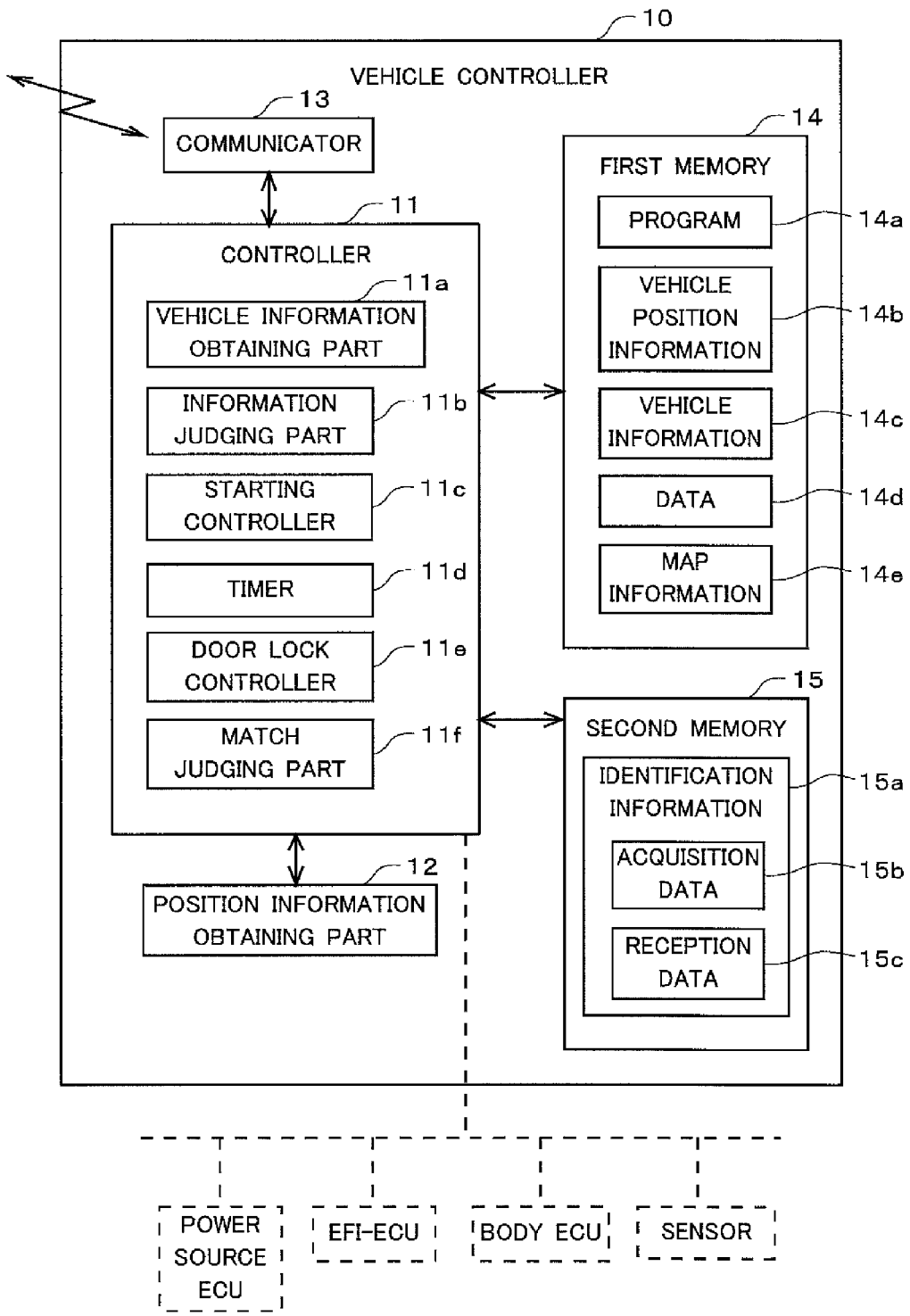
FIG. 18 shows a schematic block diagram of another vehicle controller.

FIG. 18 shows a schematic block diagram of the vehicle controller 10 of the second embodiment. As shown in FIG. 18, the vehicle controller 10 of the second embodiment includes a match judging part 11*f* in a controller 11, and includes acquisition data 15b and reception data 15c as identification information 15a in a second memory 15. These are the points different from the first embodiment. Other configurations are the same as the first embodiment.

When the command of the request for starting or the command of the request for door lock is received, the match judging part 11f judges whether the plurality of identification information are identical. In the configuration of the second embodiment, when receiving the command of the request for starting or the request for door lock from the center 30, the vehicle controller 10 obtains the identification information from the vehicle besides receiving the identification information stored in the center 30. The match judging part 11f judges through comparison whether the identification information obtained from the vehicle and the identification information received from the center 30 are identical.

The vehicle controller 10 stores the identification information received from the vehicle as the acquisition data 15b in the second memory 15, and stores the identification information received from the center 30 as the reception data 15c in the second memory 15.

Figure 19:
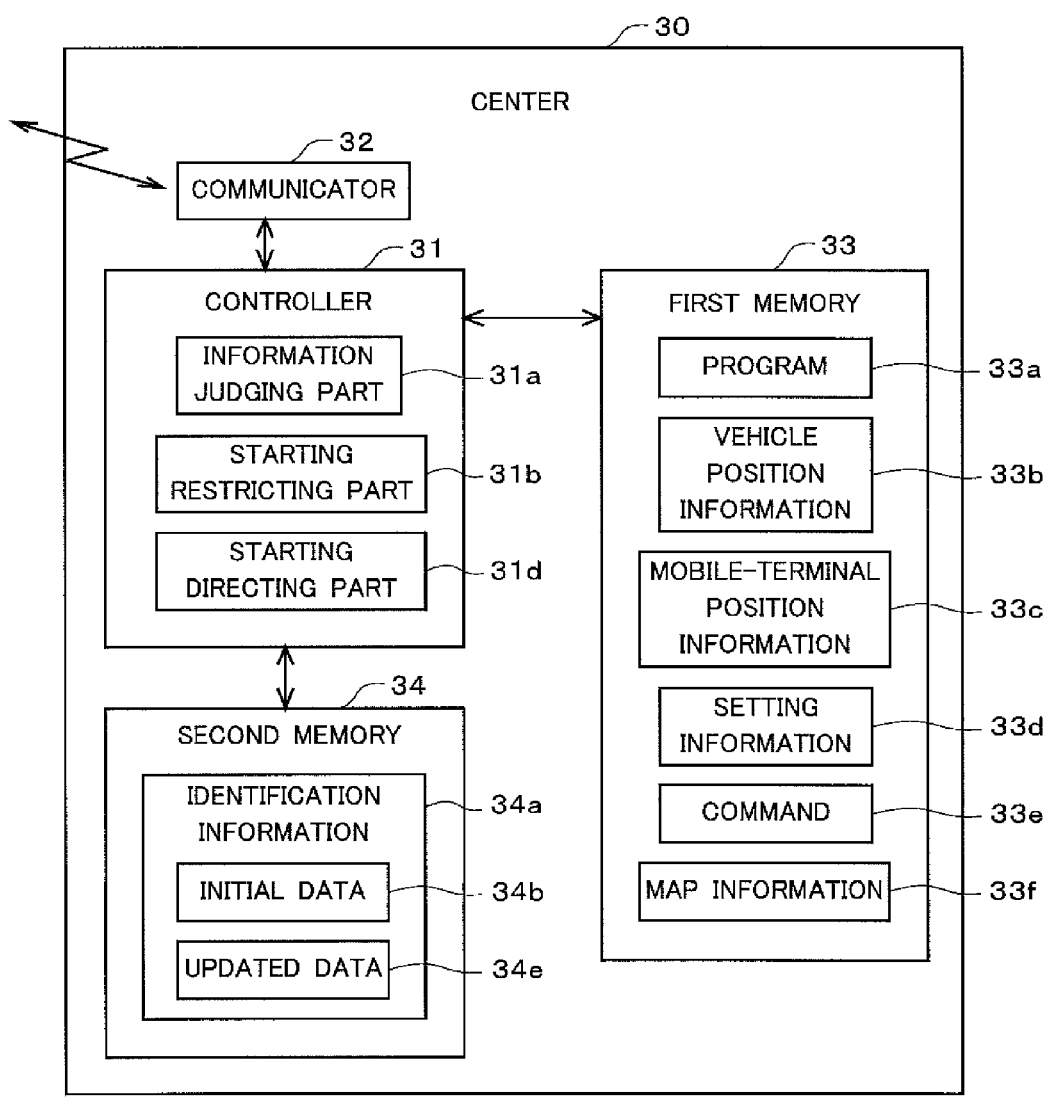
FIG. 19 shows a schematic block diagram of another center.

FIG. 19 shows a schematic block diagram of the center 30 of the second embodiment. As shown in FIG. 19, the center 30 of the second embodiment, unlike the center 30 of the first embodiment, does not include a match judging part in the controller 31. A second memory 34 includes initial data 34b and updated data 34e. Other configurations are the same as those of the first embodiment. The initial data 34b is the same as the initial data of the first embodiment. The updated data 34e is the latest data among the identification information received by the center 30.

<2-2. Processing on Vehicle Controller>

Figure 20:
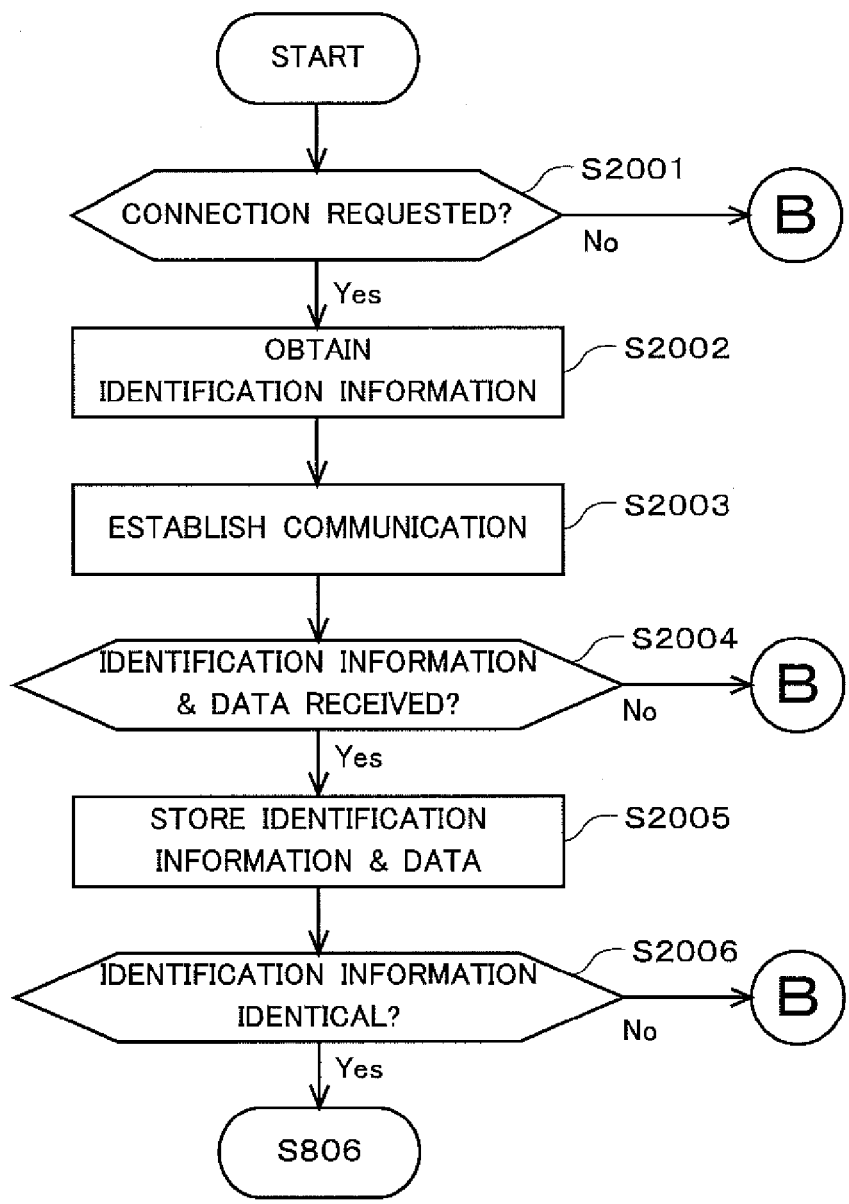
FIG. 20 shows another flowchart of the processing on the vehicle controller.

The processing in the second embodiment is different from the processing for starting and for door lock on the vehicle controller 10 described in the first embodiment regarding the procedures for communication connection with the center 30 and for receiving data (from the step S801 to the step S805 shown in FIG. 8). Other procedures of the second embodiment are the same as the ones of the first embodiment described in the FIGS. 5, 6, 7, 8 and 9. Thus, described in the second embodiment are the procedure for communication connection with the center 30 and the procedure for receiving data from the center 30. FIG. 20 shows a flowchart of the processing for starting and the processing for door lock of the second embodiment.

The controller 11 judges whether the communication connection has been requested from the center 30 (step S2001). The judgment can be made in the same manner as the step S801 described above. When the controller 11 judges that the request for communication connection has not been received (No at the step S2001), the procedure is finished (B in FIG. 20). When judging that the request for communication connection has been received (Yes at the step S2001), the controller 11 obtains the identification information (step S2002). Concretely, a vehicle information obtaining part 11a obtains the information specific to each vehicle from the in-vehicle apparatus that has the information. The obtained identification information is stored as the acquisition data 15b in the second memory 15.

Next, the vehicle controller 10 establishes the communication with the center 30 (step S2003). This can be executed in the same manner as the step S802 described above. After the communication is established, the controller 11 judges whether the identification information or any other data have been received from the center 30 (step S2004). In the configuration of the second embodiment, the center 30 transmits identification information 34a stored in the second memory 34 besides the data such as commands, to the vehicle controller 10. The vehicle controller 10 receives the both. Thus, the controller 11 judges whether the identification information and the data have been properly received from the center 30. When the controller 11 judges that neither the identification information nor any data have been received (No at the step S2004), the procedure is finished (B in FIG. 20).

When judging that the identification information and some data have been received (Yes at the step S2004), the controller 11 stores the received data in a first memory 14, and stores the received identification information in the second memory 15 (step S2005). The procedure for storing the received data in the first memory 14 can be executed in the same manner as the steps in the first embodiment described above, and the received identification information is stored as the reception data 15c in the second memory 15.

Next, the match judging part 11f judges whether the plurality of identification information 15a stored in the second memory 15 are identical (step S2006). Concretely, the match judging part 11f reads out the acquisition data 15b and the reception data 15c stored in the second memory 15, and compares the two. When the two of the data are identical, the two of the identification information are judged as identical. When the two are different, the two of the identification information are judged as not identical.

When the two of the identification information are identical (Yes at the step S2006), the vehicle is equipped with the same vehicle controller 10. Thus, it is judged that the vehicle controller 10 belongs to the proper user, and the controller 11 executes the following procedure (the steps from the step S806) regarding the request for starting or the request for door lock in the same manner as the first embodiment. When the two of the identification information are not identical (No at the step S2006), it is highly possible that the vehicle controller 10 is installed on a stranger's vehicle. Therefore, since it is judged that the vehicle controller 10 on the vehicle does not belong to the proper user, the controller 11 does not continue to execute the following procedure, and cancels the processing (B in FIG. 20).

<2-3. Processing on Center>

Figure 21:
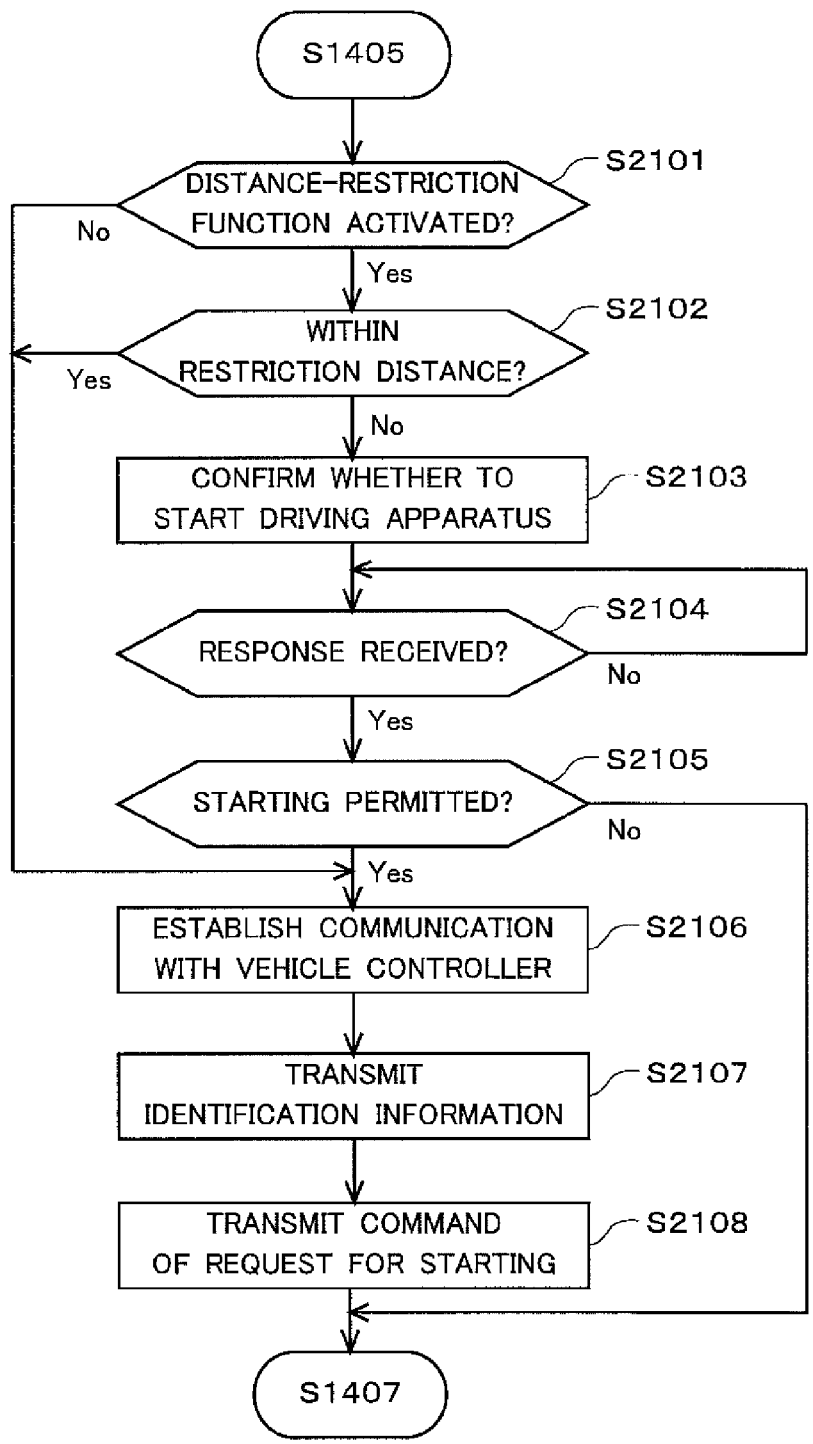
FIG. 21 shows another flowchart of the processing on the center.

The processing in the second embodiment is different from the processing regarding the procedures for transmitting the request for starting (step S1406) and for transmitting the request for door lock (step S1502) described in the first embodiment. Other procedures of the second embodiment are the same as the ones of the first embodiment described in FIG. 13, FIG. 14, and FIG. 15. Thus, described in the second embodiment are the processing for transmitting the request for starting and the processing for transmitting the request for door lock. FIG. 21 is a flowchart of processing for transmitting the request for starting.

When it is judged that the received data include the command of the request for starting at the step S1405, the center 30 executes the procedure in the same manner as the steps from the step S1601 to the step S1606 (from step S2101 to step S2106). After the communication with the vehicle controller 10 is established, the center 30 transmits the identification information (step S2107). Concretely, the controller 31 reads out the updated data 34e stored in the second memory 34, and transmits the updated data 34e to the vehicle controller 10. When the updated data 34e is not available, but only the initial data 34b is stored, the controller 31 transmits the initial data 34b.

Next, the controller 31 transmits the command of the request for starting to the vehicle controller 10 (step S2108). The order of the steps for transmitting the identification information and for transmitting the command of the request for starting may be reversed, or the steps may be executed concurrently. The following steps in the second embodiment are executed in the same manner as the steps starting from the step S1407 in the first embodiment.

Figure 22:
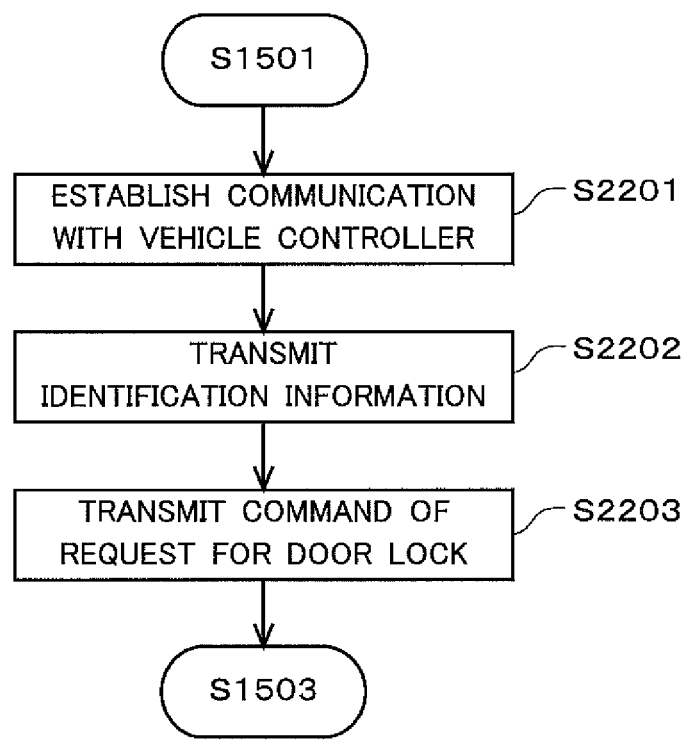
FIG. 22 shows another flowchart of the processing on the center.

Next, the processing for transmitting the request for door lock is described. FIG. 22 is a flowchart of the processing for transmitting the request for door lock.

When it is judged that the received data include the command of the request for door lock at the step S1501, the controller 31 establishes the communication with the vehicle controller 10 (step S2201). The step can be executed in the same manner as the step S1701. Next, the controller 31 transmits the identification information to the vehicle controller 10 (step S2202). In this step also, the controller 31 reads out the initial data 34b or the updated data 34e stored in the second memory 34, and transmits the initial data 34b or the updated data 34e to the vehicle controller 10. However, in the case where the identification information has been transmitted already at the step S2107, this step may be omitted.

Next, the controller 31 transmits the command of the request for door lock to the vehicle controller 10 (step S2203). The order of the steps for transmitting the identification information and for transmitting the command of the request for door lock may be reversed, or the steps may be executed concurrently. The following steps in the second embodiment are executed in the same manner as the steps starting from the step S1503 in the first embodiment.

As above, in the configuration of the second embodiment, the updated identification information stored in the center 30 is transmitted to the vehicle controller 10 at the time when the center 30 transmits the command of the request for starting or the request for door lock. On the other hand, the vehicle controller 10 receives the identification information from the center 30 besides newly obtaining the identification information of the vehicle, at the time of receiving the command. Then, the vehicle controller 10 judges whether to execute the command through matching judgment regarding the two of the identification information. That is, in the configuration of the second embodiment, the center 30 executes only the processing for transmitting the command and the identification information, and the vehicle controller 10 executes the processing for matching judgment regarding the identification information. In this case also, the matching judgment regarding the identification information is executed. Thus, when it is highly possible that the vehicle controller 10 is installed on a stranger's vehicle, that is, when it is highly possible that the vehicle controller 10 does not belong to the proper user, the processing not for permitting the request for starting or the request for door lock can be executed.

3. Third Embodiment

Next, the third embodiment is described. In the configuration of the third embodiment, the identification information is obtained when a battery of a vehicle is reconnected. There is a possibility that another vehicle controller 10 is installed at the time when the battery of the vehicle is reconnected. In the configuration of the third embodiment, the fact can be detected. Described hereinafter are mainly the different points from each of the embodiments described above.

<3-1. Configuration of System>

The outline of a vehicle control system 100 of the third embodiment has the same configuration as the vehicle control system 100 shown in FIG. 1. The configurations of a vehicle controller 10, a mobile terminal 20 and a center 30 of the third embodiment are identical to the configurations of the first embodiment. In the third embodiment, a part of the processing on the vehicle controller 10 and on the center 30 is different from the processing of each of the embodiments described above. Thus, described hereafter are mainly the different points from each of the embodiments described above regarding the configurations and the processing of the vehicle controller 10 and the center 30.

<3-2. Configuration of System>

Figure 23:
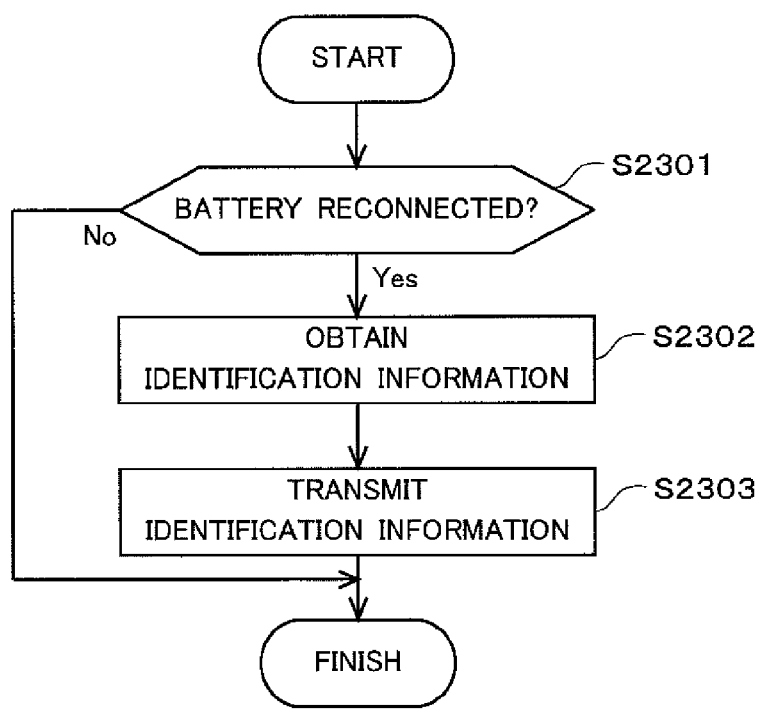
FIG. 23 shows another flowchart of the processing on the vehicle controller.

In the third embodiment, the vehicle controller 10 executes the processing for detecting that the battery of the vehicle has been reconnected after connection removal (hereinafter, referred to as "reconnection"). Described hereafter is the processing on the vehicle controller 10 for detecting reconnection of the battery. FIG. 23 shows a flowchart of the processing on the vehicle controller 10 for detecting the reconnection of the battery.

First, the vehicle controller 10 detects whether the battery has been reconnected (step S2301). The step is executed when a vehicle information obtaining part 11a obtains the information on the conditions of the battery. In an example, the vehicle information obtaining part 11a monitors the voltage of the battery. In the case of the configuration where a controller 11 can not be driven without the battery, it may be judged that the battery has been reconnected when the controller 11 itself is activated. When the reconnection of the battery has not been detected (No at the step S2301), the procedure for detection is finished.

When the reconnection of the battery has been detected (Yes at the step S2301), the controller 11 obtains the identification information (step S2302). In the same manner as the step described above, the vehicle information obtaining part 11a obtains the identification information from the in-vehicle apparatus that has the identification information. Next, the controller 11 transmits the obtained identification information to the center 30 (step S2303). After finishing the processing for detecting the reconnection of the battery, the controller 11 re-executes the same processing at the prescribed timing.

Other procedures are executed in the same manners as the steps of the first embodiment shown in the FIGS. 5 to 9.

Also when receiving the identification information that has been obtained by the vehicle controller 10 at the time of the reconnection of the battery, the center 30 stores the received identification information in a second memory 34 as well as the identification information obtained at other timings. Then, the center 30 can execute the judgment whether to transmit the request for starting or the request for door lock in the same manner as the steps of the first embodiment described above.

The processing executed on the center 30 is not limited to this. The center 30 may execute the processing for matching judgment through comparison between the two, the identification information received at the reconnection of the battery and the identification information stored in advance in the second memory 34. When the two are identical, the center 30 may execute the judgment whether to transmit various commands at the following steps in the same manner as the steps in the first embodiment described above. When the two are not identical, the center 30 may simply execute the processing not for permitting transmission of the command of the request for starting or the request for door lock at the following steps even if any of the commands is transmitted from the mobile terminal 20, without execution of the judgment itself whether to transmit the command.

As above, when it is highly possible that the vehicle controller 10 is installed on a stranger's vehicle based on the matching judgment regarding the identification information, that is, when it is highly possible that the vehicle controller 10 on the vehicle does not belong to the proper user, it becomes possible to execute the processing not for permitting the request for starting or the request for door lock.

4. Fourth Embodiment

Next, the fourth embodiment is described. In the configuration of the fourth embodiment, a vehicle controller 10 executes the matching judgment after obtaining identification information at the time of reconnection of a battery of a vehicle. Described hereafter are mainly the different points from the third embodiment.

<4-1. Configuration of System>

The outline of a vehicle control system 100 of the fourth embodiment has the same configuration as the vehicle control system 100 shown in FIG. 1. The configurations of a vehicle controller 10, a mobile terminal 20 and a center 30 of the fourth embodiment are the same as the configurations of the second embodiment. In the fourth embodiment, a part of the processing on the vehicle controller 10 and the center 30 is different from the processing of each of the embodiments described above. Thus, described hereafter are mainly the different points from each of the embodiments described above regarding the configurations of the vehicle controller 10 and the center 30 and the processing on the vehicle controller 10 and the center 30.

<4-2. Processing of System>

Figure 24:
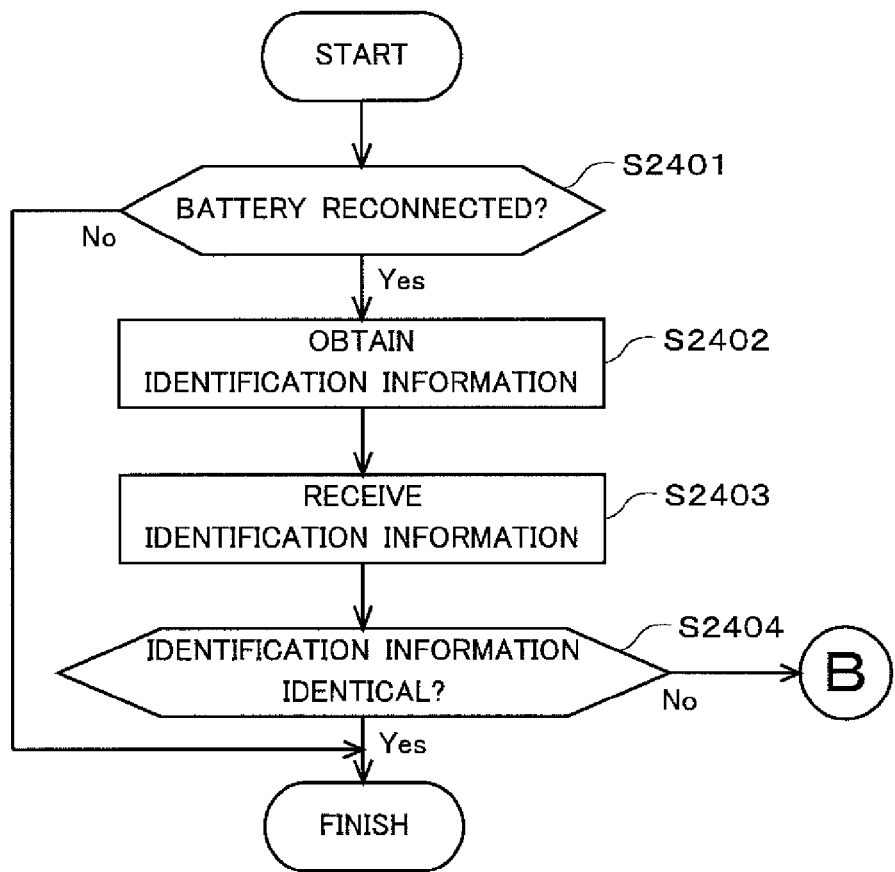
FIG. 24 shows another flowchart of the processing on the vehicle controller.

In the fourth embodiment, the vehicle controller 10 executes the processing for detecting reconnection of the battery of the vehicle, in the same manner as the steps in the third embodiment. Described hereafter is the processing on the vehicle controller 10 for detecting reconnection of the battery. FIG. 24 shows a flowchart of the processing on the vehicle controller 10 for detecting the reconnection of the battery.

First, the vehicle controller 10 detects whether the battery has been reconnected (step S2401). The step can be executed in the same manner as the step S2301. When the reconnection of the battery has not been detected (No at the step S2401), the procedure for detection is finished.

When the reconnection of the battery has been detected (Yes at the step S2401), a controller 11 obtains the identification information (step S2402). In the same manner as the step described above, a vehicle information obtaining part 11a obtains the identification information from the in-vehicle apparatus that has the identification information. Then, the controller 11 establishes the communication with the center 30, and receives the identification information stored in the center 30 (step S2403). A match judging part 11f executes matching judgment through comparison between the identification information obtained at the step S2402 and the identification information received at the step S2403. When the two of the identification information are identical (Yes at the step S2404), the controller 11 executes the processing for starting or the processing for door lock same as the steps starting from the step S801. When the two of the identification information are not identical (No at the step S2404), the procedure is finished without execution of the following steps for starting or the processing for door lock (B in FIG. 24). After finishing the processing described above, for detecting the reconnection of the battery, the controller 11 re-executes the same processing at the prescribed timing.

Also in the fourth embodiment, other procedures are executed in the same manner as the steps of the second embodiment shown in the FIGS. 5 to 9 and FIG. 20. The center 30 can execute the processing in the same manner as the steps of the second embodiment shown in the FIGS. 13 to 15 and the FIGS. 21 and 22. Further, when establishing the communication with the vehicle controller 10 at the step S1302 shown in FIG. 13, the center 30 may execute the processing for transmitting to the vehicle controller 10 the identification information stored in a second memory 34.

As above, when it is highly possible that the vehicle controller 10 is installed on a stranger's vehicle based on the matching judgment regarding the identification information, that is, when it is highly possible that the vehicle controller 10 on the vehicle does not belong to the proper user, it becomes possible to execute the processing not for permitting the request for starting or the request for door lock.

5. Fifth Embodiment

Next, the fifth embodiment is described. In the embodiments described above, when detecting that an IG switch is switched off from an on-state or switched on from an off-state, the vehicle controller 10 executes the processing for transmitting the vehicle position information to the center 30. However, in the configuration where the vehicle controller 10 transmits the vehicle position information to the center 30 every time, there is a risk that a stranger misuses the obtained vehicle position information, for example, when a vehicle is equipped with the vehicle controller that belongs to the stranger, not to a proper user.

In an example, when the stranger installs on stranger's mobile terminal the application that displays on stranger's mobile terminal the direction or the distance from the current position of the mobile terminal to the vehicle parking position (hereinafter, referred to as "car finder application"), the stranger can get to the vehicle based on the obtained vehicle position information, by using the car finder application.

Therefore, in the configuration of the fifth embodiment, only when the vehicle controller belongs to the proper user, the processing for transmitting the vehicle position information is executed, and when the vehicle controller does not belong to the proper user, the processing for transmitting the vehicle position information is not executed. The configuration where the processing for transmitting the vehicle position information is not executed allows the center 30 to judge that the vehicle controller does not belong to the proper user. Thus, in the configuration of the fifth embodiment, a center 30 may not execute the processing for starting or door lock when judging that the vehicle controller does not belong to the proper user. Described hereafter are mainly the different points from each of the embodiments described above.

<5-1. Outline of System>

A vehicle control system 100 of the fifth embodiment has the same configuration as the vehicle control system 100 shown in FIG. 1. That is, in the configuration, the vehicle controller 10, the mobile terminal 20 and the center 30 of any of the embodiments described above can be used as a vehicle controller 10, a mobile terminal 20 and the center 30 of the fifth embodiment. In the fifth embodiment, the processing on the mobile terminal 20 is the same as any of the embodiments described above. However, a part of the processing on the vehicle controller 10 and a part of the processing on the center 30 are different from the embodiments described above. Therefore, described hereafter are mainly the different points from the embodiments described above, regarding the processing on the vehicle controller 10 and the center 30.

<5-2. Processing on Vehicle Controller>

Figure 25:
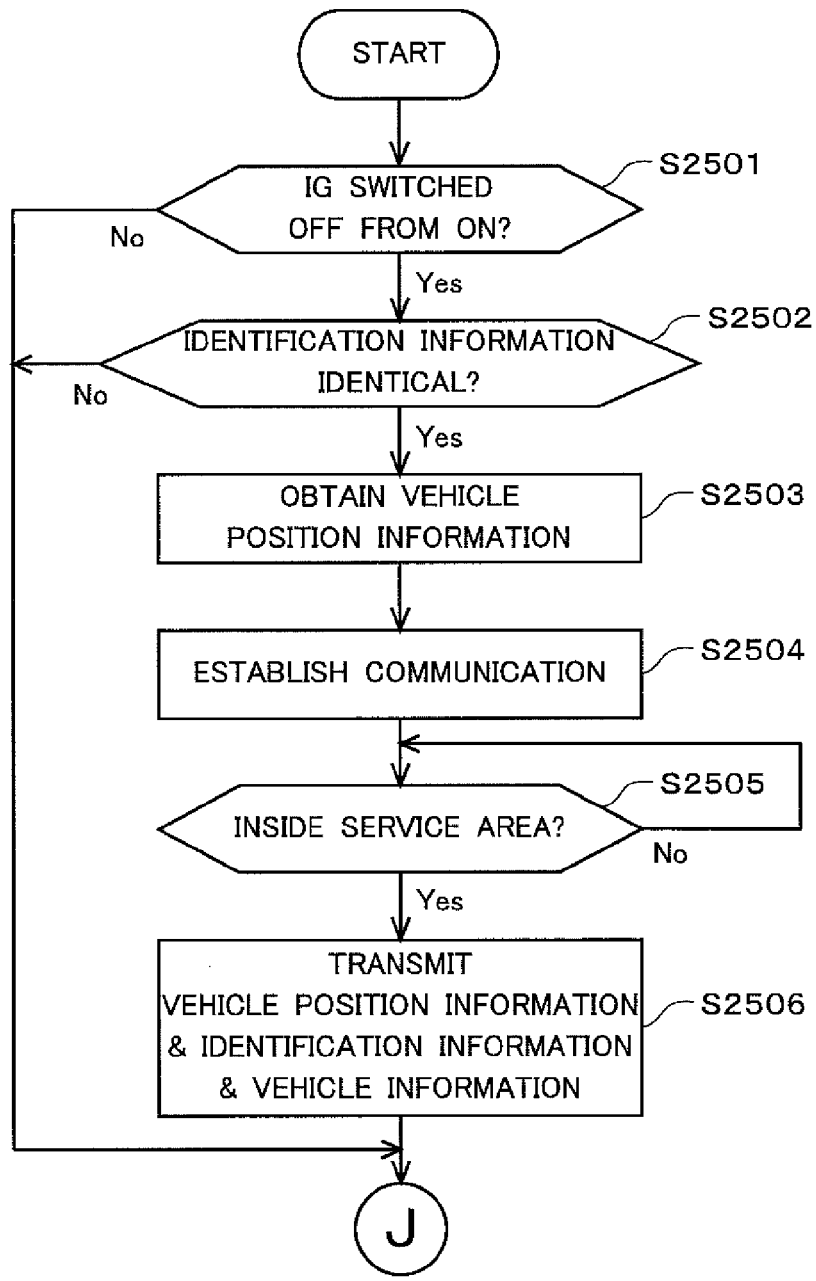
FIG. 25 shows another flowchart of the processing on the vehicle controller.
Figure 26:
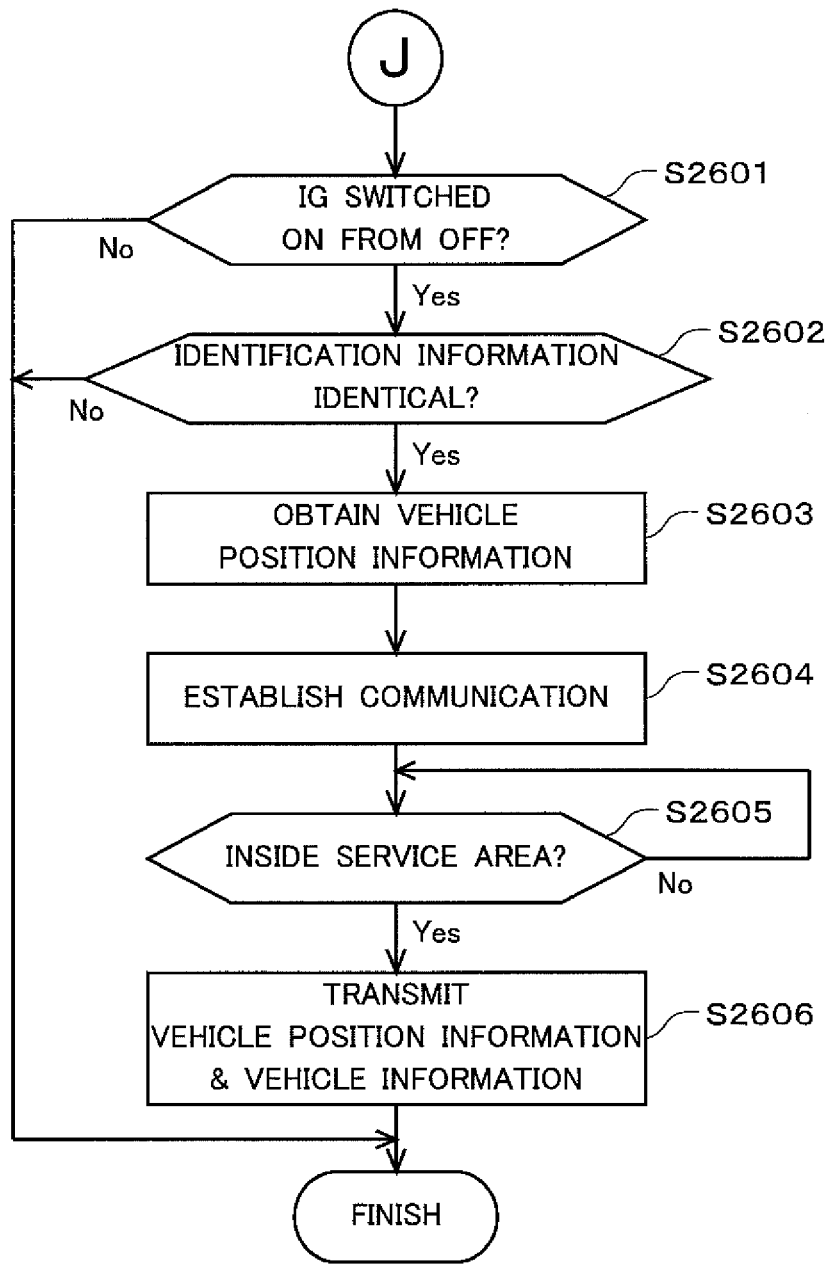
FIG. 26 shows another flowchart of the processing on the vehicle controller.

The processing in the fifth embodiment is different from the processing on the vehicle controller 10 of each of the embodiments described above, partially regarding the procedure for transmitting the vehicle position information described in FIG. 6. Other procedures are the same. Thus, in the fifth embodiment, the processing for transmitting the vehicle position information is described. Each of FIG. 25 and FIG. 26 shows a flowchart of the processing for transmitting the vehicle position information of the fifth embodiment.

First, a vehicle information obtaining part 11*a* detects whether an ignition switch has been manually switched off from an on-state (step S2501). Concretely, while the ignition switch is in the on-state, upon reception via CAN from a power source ECU, of the signal indicating that the ignition switch is in the off-state, the vehicle information obtaining part 11*a* detects that the ignition switch has been switched off from the on-state.

When the vehicle information obtaining part 11*a* does not detect that the ignition switch has been switched off from the on-state (No at the step S2501), the procedure moves to the step, described later, for detecting whether the ignition switch has been switched on from the off-state (J in FIG. 25).

When the vehicle information obtaining part IIa detects that the ignition switch has been switched off from the on-state (Yes at the step S2501), the controller 11 judges whether the plurality of identification information are identical (step S2502). The judgment is made in order to judge whether the vehicle controller 10 belongs to the proper user.

The matching judgment of the identification information may be made based on the comparison among the plurality of identification information stored in a second memory 15, or may be made based on the comparison between the identification information obtained from the center 30 and the identification information obtained by the vehicle controller 10 after the communication with the center 30 is established.

When the controller 11 judges that the plurality of identification information are not identical (No at the step S2502), the procedure moves to the step for detecting whether the ignition switch has been switched on from the off-state, described later (J in FIG. 25).

When judging that the plurality of identification information are identical (Yes at the step S2502), the controller 11 obtains the vehicle position information (step S2503). The controller 11 establishes the communication with the center 30 (step S2504). When the communication with the center 30 has been established already, this step can be omitted. Then, a communicator 13 judges whether the vehicle is in the service area where the communication with the center 30 is available (step S2505). When judging that the vehicle is in the service area (Yes at the step S2505), the communicator 13 transmits the vehicle position information, the identification information and the vehicle information to the center 30 (step S2506). When judging that the vehicle is not in the service area (No at the step S2505), the communicator 13 judges again whether the vehicle is in the service area. The details of each of these steps (from the step S2503 to the step S2506) are the same as the step S602, the step S604, the step S605 and the step S606, described above.

Next, the vehicle information obtaining part 11*a* detects whether the ignition switch has been manually switched on from the off-state (step S2601). Concretely, upon reception via the CAN from the power source ECU, of the signal indicating that the ignition switch is in the on-state while the ignition switch is in the off-state; the vehicle information obtaining part 11*a* detects that the ignition switch has been switched on from the off-state.

When the vehicle information obtaining part 11*a* does not detect that the ignition switch has been switched on from the off-state (No at the step S2601), the procedure is finished without any execution. When the vehicle information obtaining part 11*a* detects that the ignition switch has been switched on from the off-state (Yes at the step S2601), the controller 11 judges whether the two or the plurality of identification information are identical (step S2602). The judgment is made, in this case also, in order to judge whether the vehicle controller 10 belongs to the proper user. The matching judgment can be made in the same manner as the step described above.

When the controller 11 judges that the plurality of identification information are not identical (No at the step S2602), the procedure is finished without any execution. When judging that the plurality of identification information are identical (Yes at the step S2602), the controller 11 obtains the vehicle position information (step S2603). Then, the controller 11 establishes the communication with the center 30 (step S2604).

After that, the communicator 13 judges whether the vehicle is in the service area where the communication with the center 30 is available (step S2605). When judging that the vehicle is in the service area (Yes at the step S2605), the communicator 13 transmits the vehicle position information and the vehicle information to the center 30 (step S2606). When judging that the vehicle is not in the service area (No at the step S2605), the communicator 13 judges again whether the vehicle is in the service area. The details of each of these steps (from the step S2603 to the step S2606) are the same as the step S702 and the steps S704 to S706, described above.

As above, the vehicle controller 10 confirms the identification information stored in the second memory 15 of the vehicle controller 10 or the identification information stored in a second memory 34 of the center 30, when the ignition switch has been manually switched on or off. Through the confirmation, the vehicle controller 10 judges whether the vehicle controller 10 belongs to the proper user. Only when judging that the vehicle controller 10 belongs to the proper user, the vehicle controller 10 executes the processing for transmitting the vehicle position information to the center 30. This prevents a stranger from obtaining the vehicle position by use of a car finder application or other applications even if the stranger installs another vehicle controller on the vehicle.

<5-3. Processing on Center>

Figure 27:
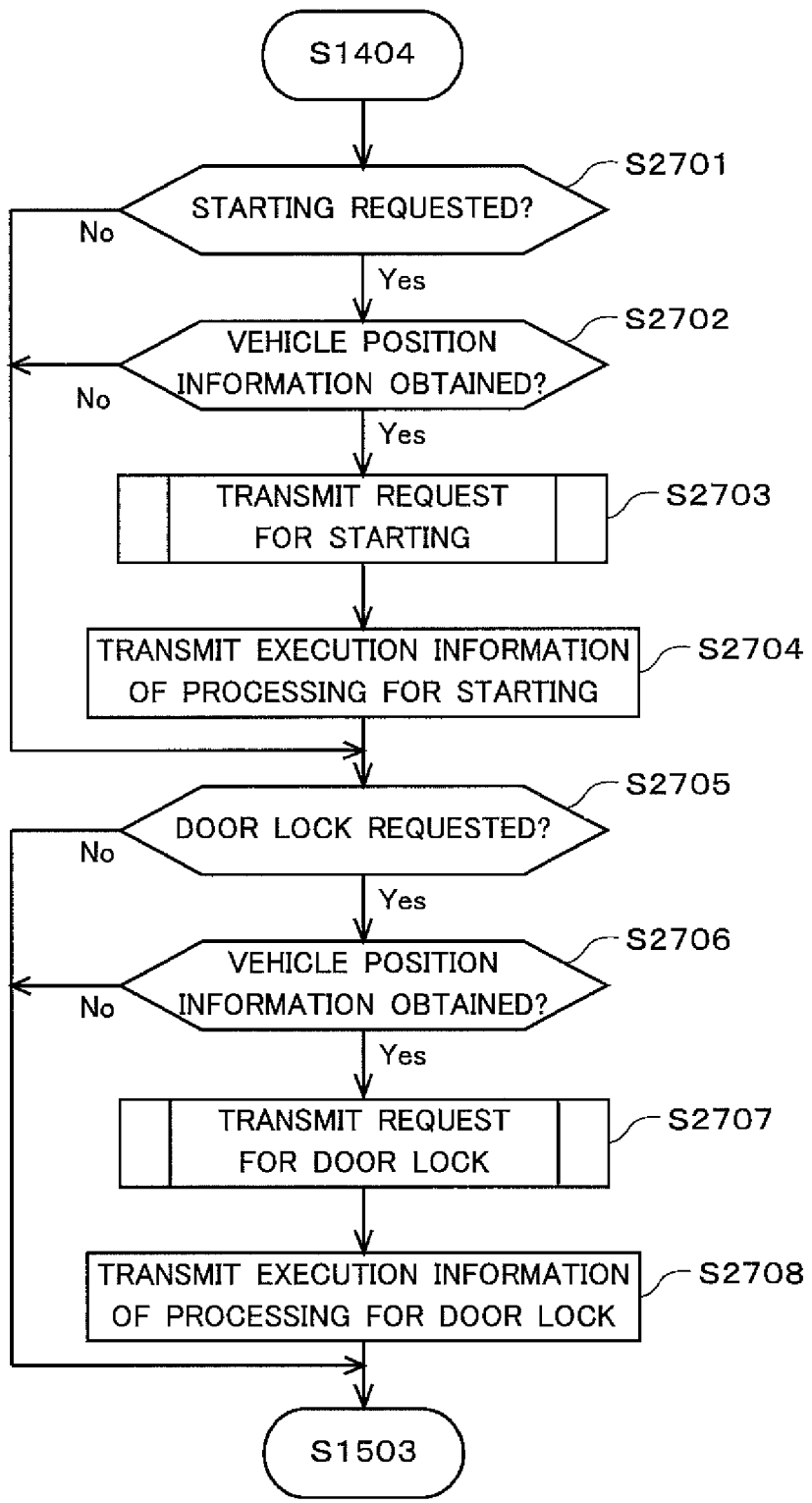
FIG. 27 shows another flowchart of the processing on the center.

The processing in the fifth embodiment is different from the processing on the center 30 of each of the embodiments described above, regarding the procedure for confirming whether the vehicle position information has been obtained. Other procedures are the same as the procedures shown in FIG. 13, FIG. 14 and FIG. 15. Therefore, in the fifth embodiment, the processing on the center 30 for confirming the vehicle position information is mainly described. FIG. 27 shows a flowchart of the processing on the center 30 of the fifth embodiment.

Figure 13:
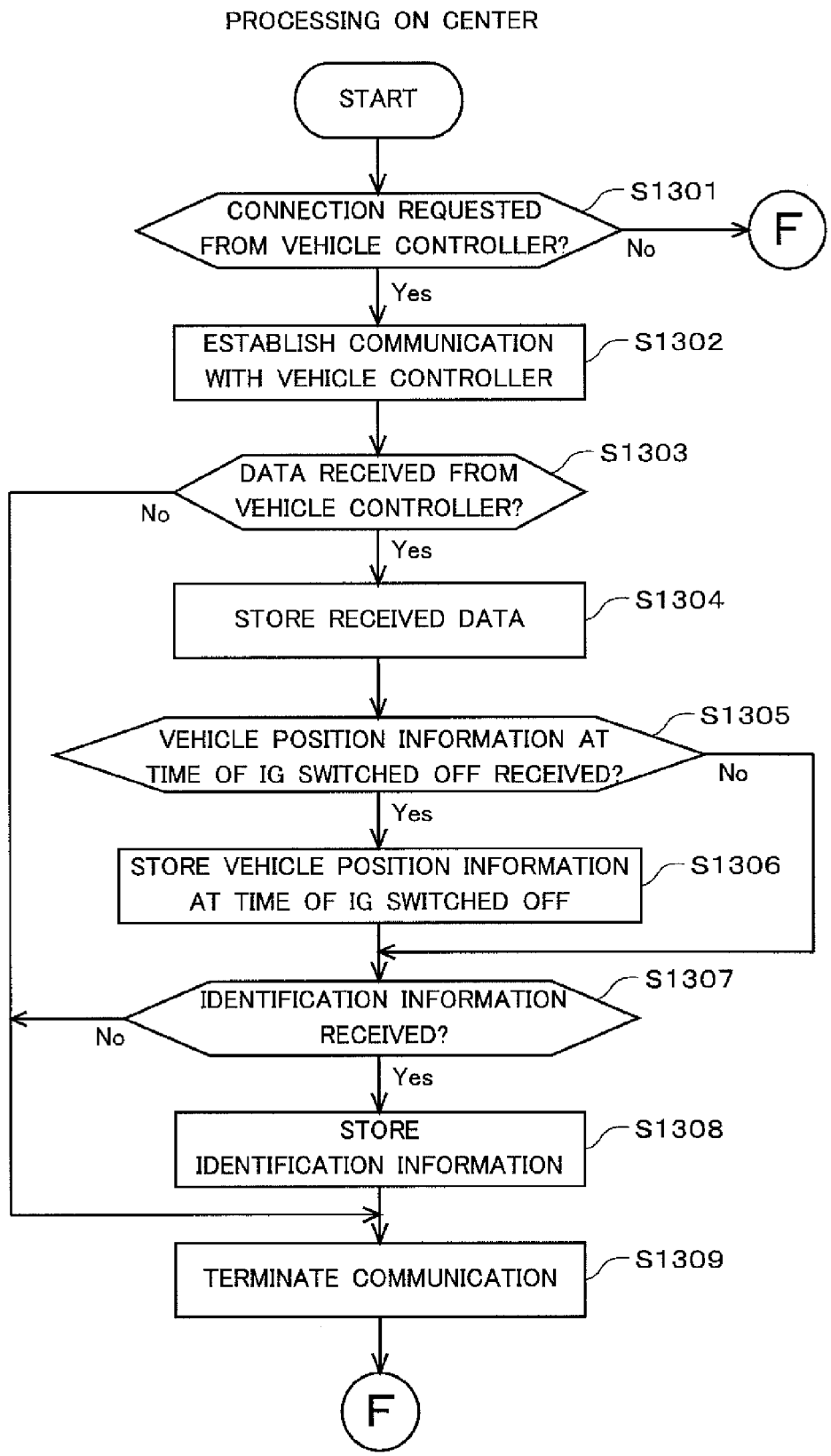
FIG. 13 shows another flowchart of the processing on the center.

After executing the procedure of the steps (from the step S1301 to the step S1309) shown in FIG. 13 and the procedure of the steps (from the step S1401 to the step S1404) shown in FIG. 14, the center 30 judges whether the received data include the command of the request for starting (step S2701). The step for judgment can be executed in the same manner as the step S1405. When it is judged that the received data include the command of the request for starting (Yes at the step S2701), a controller 31 judges whether the vehicle position information has been obtained (step S2702). When the controller 31 judges that the received data do not include the command of the request for starting (No at the step S2701), or when the controller 31 judges that the vehicle position information has not been obtained (No at the step S2702), the procedure moves to the next step without execution of the processing on the controller 31 regarding the request for starting.

As above, when the plurality of identification information are not identical, the vehicle controller 10 does not transmit the vehicle position information based on the judgment where the vehicle controller 10 does not belong to the proper user. Therefore, the center 30 can judge that the vehicle controller 10 does not belong to the proper user, based on the fact that the center 30 has not obtained the vehicle position information. That is, when the center 30 has not obtained the vehicle position information, the center 30 prohibits the processing for starting based on the judgment that the vehicle controller 10 does not belong to the proper user, even if the center 30 receives the request for starting from the mobile terminal 20.

When judging that the vehicle position information has been obtained (Yes at the step S2707), the controller 31 executes the step for transmitting the request for starting (step S2703), and the step for transmitting the execution information on the processing for starting (step S2704). Each of these steps can be executed in the same manner as the step S1406 and the step S1407.

Next, the center 30 judges whether the received data include the command of the request for door lock (step S2705). The step for judgment can be executed in the same manner as the step S1501. When it is judged that the received data include the command of the request for door lock (Yes at the step S2705), the controller 31 judges whether the vehicle position information has been obtained (step S2706).

The step S2706 is executed in the same manner as the step S2702 described above. That is, when the controller 31 judges that the vehicle position information has not been obtained (No at the step S2706), the procedure moves to the next step (step S1503) without execution of the processing on the controller 31 regarding the request for door lock. When judging that the vehicle position information has been obtained (Yes at the step S2706), the controller 31 executes the step regarding the door lock (step S2707), and the step for transmitting the execution information on the processing for door lock (step S2708). Each of these steps can be executed in the same manner as the step S1502 and the step S1503. Then, the procedure moves to the step S1503 shown in FIG. 15. As above, when the vehicle controller 10 does not belong to the proper user, the center 30 also prohibits the processing regarding the door lock.

In the fifth embodiment, the center 30 judges whether the vehicle position information has been obtained when receiving the command of the request for starting or receiving the command of the request for door lock. However, the center 30 may judge whether the vehicle position information has been obtained when receiving the command of the request for communication connection from the mobile terminal 20. In this case, it is possible to prohibit the following procedure when the vehicle controller does not belong to the proper user, without execution of judgment such as on whether any data have been received from the mobile terminal 20, and what the received data are, if any.

6. Sixth Embodiment

Next, the sixth embodiment is described. In each of the embodiments described above, when detecting that the IG switch has been switched off from the on-state or switched on from the off-state, the vehicle controller 10 executes the processing for transmitting the vehicle position information to the center 30. However, in most cases, a vehicle control system 100 of the invention or the like becomes available after conclusion of a contract between a service provider and a user. It is undesirable that the vehicle controller 10 automatically transmit the vehicle position information even after cancellation of the contract.

Therefore, in the configuration of the sixth embodiment, the processing for transmitting the vehicle position information is changed in accordance with the status of the contract with the user for the service. Described hereafter are mainly the different points from each of the embodiments described above.

<6-1. Outline of System>

A vehicle control system 100 of the sixth embodiment has the same configuration as the vehicle control system 100 shown in FIG. 1. However, a vehicle controller 10 and a center 30 of the sixth embodiment store a flag indicating the status of the contract (hereinafter, referred to as "contract flag") respectively in a first memory 14 and in a first memory 33. In the sixth embodiment, the processing on the vehicle controller 10 and the processing on the center 30 are partially different from each of the embodiments described above. The configuration of and the processing on the mobile terminal 20 are the same as each of the embodiments described above. Therefore, described hereinafter are mainly the different points from any of the embodiments described above, regarding the processing on the vehicle controller 10 and the processing on the center 30.

<6-2. Processing on Center>

Figure 28:
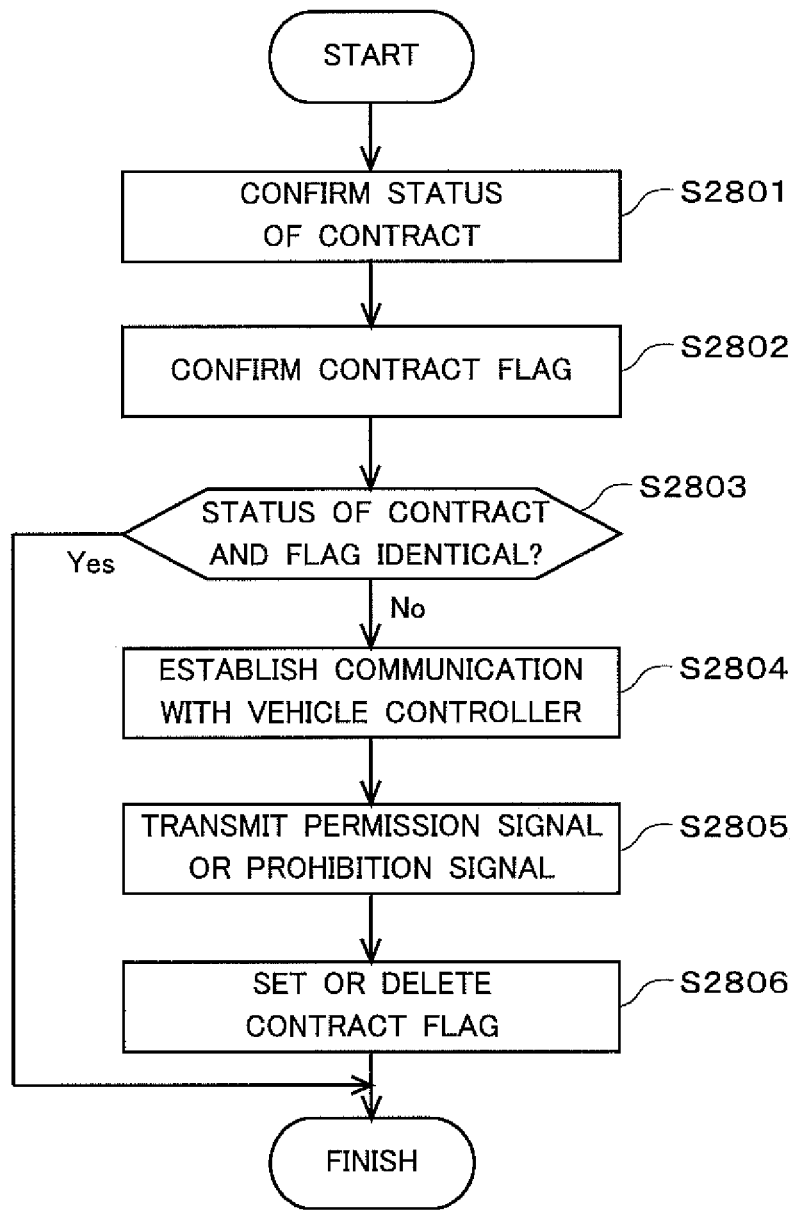
FIG. 28 shows another flowchart of the processing on the center.

The center 30 monitors the status of the contract, and transmits to the vehicle controller 10 the information on whether to transmit the vehicle position information based on the status of the contract. Thus, described first is the processing on the center 30 for transmitting the information on whether to transmit the vehicle position information based on the status of the contract. FIG. 28 shows a flowchart of the processing on the center 30.

The center 30 confirms the status of the contract with the user periodically or when receiving the request for communication connection from the vehicle controller 10 or a mobile terminal 20 (step S2801). The information, "under contract" or "contract cancelled," on the status of the contract is stored, for example, in the database sorted for each user. Next, the center 30 confirms the contract flag (step S2802). In the sixth embodiment, when the contract is concluded, that is "under contract," the center 30 sets the contract flag. When the contract is cancelled, that is "contract cancelled," the center 30 deletes the contract flag. In the configuration of the sixth embodiment, the center 30 does not change the contract flag while the status of the contract is not changed. That is, the center 30 confirms whether the contract flag is set, as well as confirming the information on the contract.

After confirming the status of the contract and the contract flag, the center 30 judges whether the contents of the status of the contract and the contract flag are matched (step S2803). That is, the center 30 judges that the status of the contract and the contract flag are matched when judging that the status indicates "under contract," and when the contract flag is set. The judgment in the case of "contract cancelled" is made in the same manner. When judging that the contents of the status of the contract and the contract flag are matched (Yes at the step S2803), the center 30 judges that the status of the contract is not changed, and the procedure is finished.

When judging that the contents of the status of the contract and the contract flag are not matched (No at the step S2803), the center 30 executes the processing for transmitting to the vehicle controller 10 the information on whether to transmit the vehicle position information. First, the center 30 establishes the communication with the vehicle controller 10 (step S2804). The step can be executed in the same manner as each of the embodiments described above. Then, the center 30 transmits to the vehicle controller 10 the signal indicating permission or the signal indicating prohibition on transmission of the vehicle position information (step S2805).

Here is an example where the contents are not matched; although the center 30 has confirmed that the status indicates "under contract," the contract flag is not set. Concretely, since it is judged that a new contract has been concluded, the center 30 transmits to the vehicle controller 10 the permission signal to permit transmission of the vehicle position information. Then, the center 30 sets the contract flag in the first memory 33 (step S2806). Here is another example where the contents are not matched; although the center 30 has confirmed that the status indicates "contract cancelled," the contract flag is set. Concretely, since it is judged that the contract has been newly cancelled, the center 30 transmits to the vehicle controller 10 the prohibition signal to prohibit transmission of the vehicle position information. Then, the center 30 deletes the contract flag in the first memory 33 (step S2806).

In the case where the contract flag is not set, the center 30 does not execute any of the processing even when receiving the direction for controlling the vehicle from a distance from the mobile terminal 20. In the case where the contract flag is set, the center 30 executes the processing shown in FIG. 13 and the following figures when receiving direction for controlling the vehicle from a distance from the mobile terminal 20.

<6-3. Processing on Vehicle Controller>

Next, the processing on the vehicle controller 10 is described. When receiving the permission signal or the prohibition signal for transmitting the vehicle position information from the center 30, the vehicle controller 10 judges the status of the contract based on the received signal, and controls whether to execute the processing for starting or the processing for transmitting the vehicle position information. Hereafter, the processing on the vehicle controller 10 is described.

Figure 29:
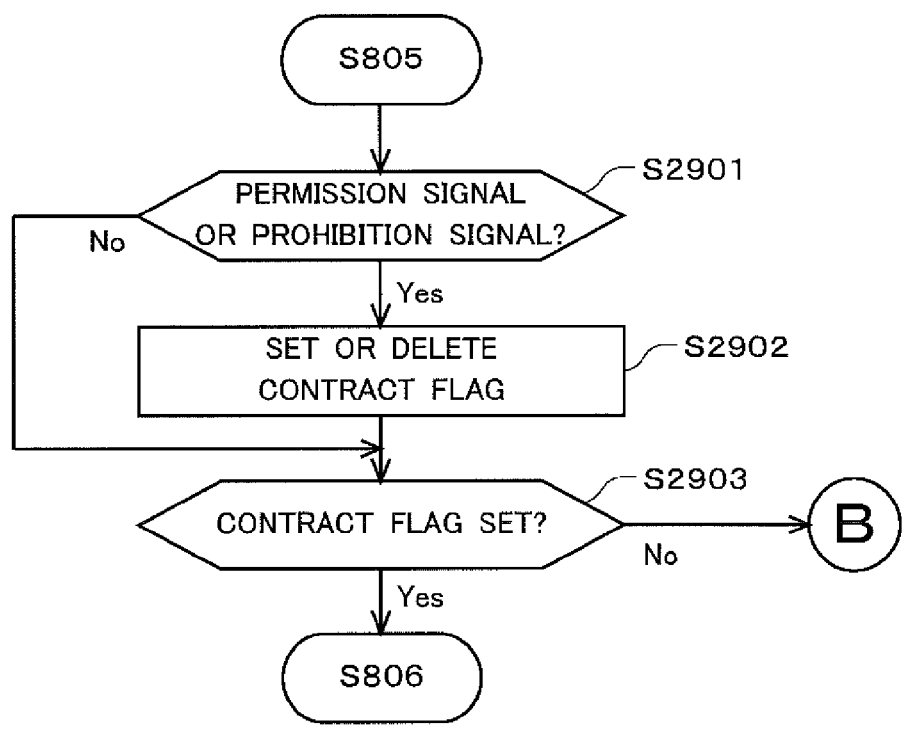
FIG. 29 shows another flowchart of the processing on the vehicle controller.

FIG. 29 shows a flowchart of the processing on the vehicle controller 10 for setting the contract flag. The vehicle controller 10 executes the procedure from the step for receiving the request for communication connection from the center 30 to the step for storing data in the same manner as the steps from the step S801 to the step S805. After storing the data, the vehicle controller 10 judges whether the data received from the center 30 correspond to either of the permission signal and the prohibition signal for transmitting the vehicle position information (step S2901).

When judging that the received data correspond to either the permission signal or the prohibition signal (Yes at the step S2901), the vehicle controller 10 sets or deletes the contract flag in the first memory 14 in accordance with the signal type (step S2902). That is, the vehicle controller 10 sets the contract flag when the received data correspond to the permission signal, and deletes the contract flag when the received data correspond to the prohibition signal.

When judging that the received data correspond to neither the permission signal nor the prohibition signal (No at the step S2901), the vehicle controller 10 judges whether the contract flag is set in the first memory 14 (step S2903). When the contract flag is set (Yes at the step S2903), the vehicle controller 10 continues the processing such as for starting (step S806 and the following steps). When the contract flag is not set, the procedure is finished without execution of the processing on the vehicle controller 10 such as for starting (B in FIG. 29).

Figure 30:
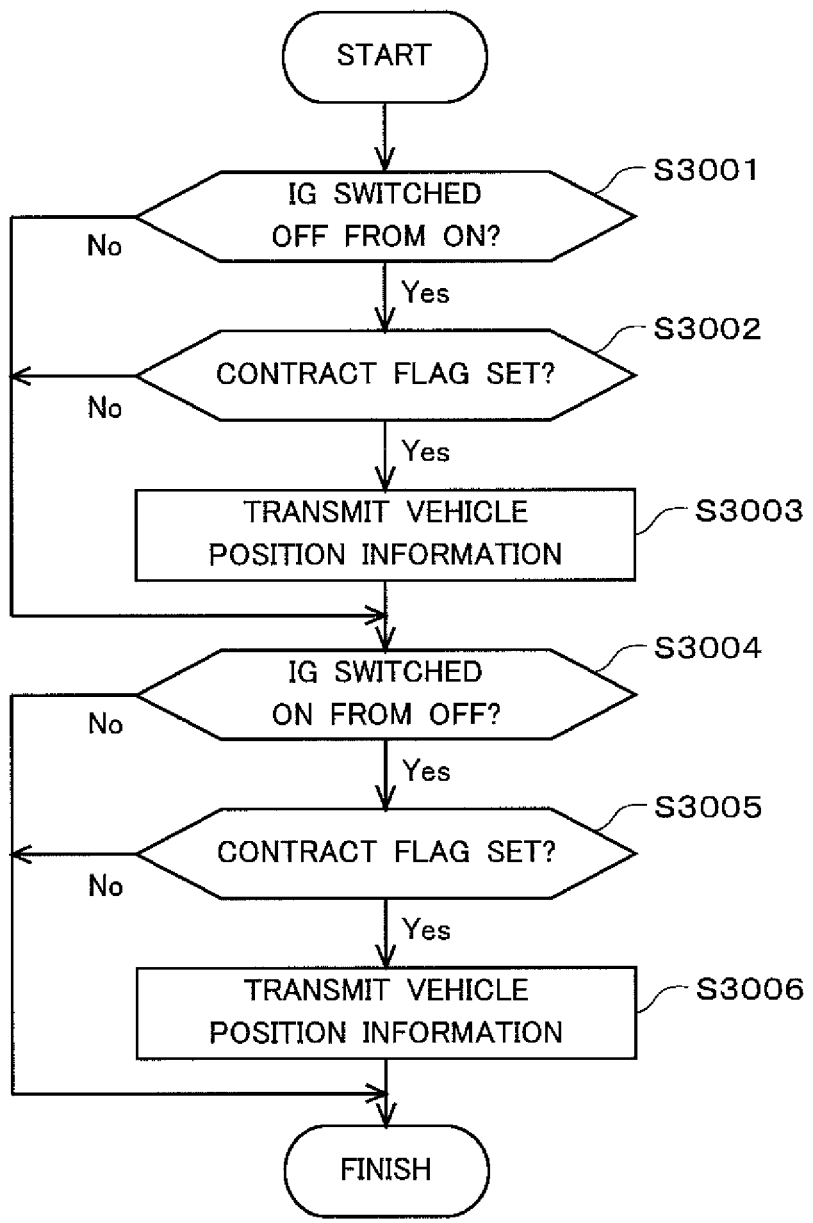
FIG. 30 shows another flowchart of the processing on the vehicle controller.

Described next is the processing on the vehicle controller 10 for controlling whether to transmit the vehicle position information based on the status of the contract. FIG. 30 shows a flowchart of the processing on the vehicle controller 10 for transmitting the vehicle position information.

First, a vehicle information obtaining part 11a detects whether an ignition switch has been manually switched off from an on-state (step S3001). The step can be executed in the same manner as the step S601 described above. When the vehicle information obtaining part 11a detects that the ignition switch has been switched off from the on-state (Yes at the step S3001), the vehicle controller 10 judges whether the contract flag is set in the first memory 14 (step S3002). When the contract flag is set (Yes at the step S3002), the vehicle controller 10 executes the processing for transmitting the vehicle position information (step S3003). The step can be executed in the same manner as the steps from the step S602 to the step S606 described above.

When the vehicle information obtaining part 11a does not detect that the ignition switch has been switched off from the on-state (No at the step S3001), or when the contract flag is not set in the first memory 14 (No at the step S3002), the procedure moves to the next step without execution of the processing for transmitting the vehicle position information.

Next, the vehicle information obtaining part 11a detects whether the ignition switch has been manually switched on from the off-state (step S3004). The step can be executed also in the same manner as the step S701 described above. When the vehicle information obtaining part 11a detects that the ignition switch has been switched on from the off-state (Yes at the step S3004), the vehicle controller 10 judges whether the contract flag is set in the first memory 14 (step S3005). When the contract flag is set (Yes at the step S3005), the vehicle controller 10 executes the processing for transmitting the vehicle position information (step S3006). The step can be executed also in the same manner as the steps from the step S702 to the step S706 described above.

When the vehicle information obtaining part 11a does not detect that the ignition switch has been switched on from the off-state (No at the step S3004), or when the contract flag is not set in the first memory 14 (No at the step S3005), the procedure is finished without execution of the step for transmitting the vehicle position information.

As above, since the vehicle controller 10 judges whether to transmit the vehicle position information based on the status of the contract, the vehicle controller 10 prevents the case where the vehicle position information is automatically transmitted in spite of the state where the contract is cancelled.

Further, in each of the embodiments described above, various functions are executed by software, specifically by CPU processing based on programs. However, some of these functions may be executed by electrical hardware circuits. Contrarily, some of the functions executed through hardware circuits in the above descriptions may be executed through software.

While the invention has been shown and described in detail, the foregoing description is in all aspects illustrative and not restrictive. It is therefore understood that numerous other modifications and variations can be devised without departing from the scope of the invention.

What is claimed is:

1. A vehicle controller that is installed in a vehicle and that controls one or more operations of the vehicle, the vehicle controller comprising:
a communicator that communicates with an information processor that is located outside the vehicle by transmitting and receiving information; and
a control unit configured to:

(i) obtain a first set of identification information specific to the vehicle, the first set of identification information being obtained at a time when an ignition of the vehicle is turned off, (ii) store the first set of identification information in a memory, (iii) obtain a second set of identification information specific to the vehicle at a time that a request to control one or more operations is made by a user, (iv) make a matching judgment on whether the first set of identification information and the second set of identification information are identical or not, (v) judge whether to permit the control of the one or more operations of the vehicle based on the matching judgment, and (vi) prevent control of the one or more operations of the vehicle even if the first and second identification information are identical, when a distance comparison of a distance between the user at a time of making the request and the vehicle is more than a predetermined distance, the distance comparison occurring depending upon an activation status of a distance restriction unit that determines whether the distance between the user at the time of making the request exceeds the predetermined distance, wherein the control unit permits the control of the one or more operations of the vehicle when the first set of identification information and the second set of identification information are identical, and does not permit the control of the one or more operations of the vehicle when the first set of identification information and the second set of identification information are not identical.

2. The vehicle controller according to claim 1, wherein the one or more operations of the vehicle include a door lock/unlock operation.

3. The vehicle controller according to claim 1, wherein the one or more operations of the vehicle include a vehicle ignition start/stop operation.

4. A vehicle controller that is installed in a vehicle and that controls one or more operations of the vehicle, the vehicle controller comprising:

a detector that detects reconnection of a battery of the vehicle;

a communicator that communicates with an information processor that is located outside the vehicle by transmitting and receiving information; and a control unit configured to:

(i) obtain a first set of identification information specific to the vehicle, the first set of identification information being obtained at a time when an ignition of the vehicle is turned off, (ii) store the first set of identification information in a memory, (iii) obtain a second set of identification information specific to the vehicle at a time that a request to control one or more operations is made by a user, (iv) make a matching judgment on whether the first set of identification information and the second set of identification information are identical or not, (v) judge whether to permit the control of the one or more operations of the vehicle based on the matching judgment, and (vi) prevent control of the one or more operations of the vehicle even if the first and second identification information are identical, when a distance comparison of a distance between the user at a time of making the request and the vehicle is more than a predetermined distance, the distance comparison occurring depending upon an activation status of a distance restriction unit that determines whether the distance between the user at the time of making the request exceeds the predetermined distance, wherein when the detector detects the reconnection of the battery, the control unit obtains updated data of the identification information, and the control unit permits the control of the one or more operations of the vehicle when the first set of identification information and the second set of identification information are identical, and does not permit the control of the one or more operations of the vehicle when the first set of identification information and the second set of identification information are not identical.

5. The vehicle controller according to claim 4, wherein the one or more operations of the vehicle include a door lock/unlock operation.

6. The vehicle controller according to claim 4, wherein the one or more operations of the vehicle include a vehicle ignition start/stop operation.

7. An information processor that is outside of a vehicle and that is configured to be communicatively coupled to a mobile terminal and to the vehicle, and that, when receiving a request for control of one or more operations of the vehicle from the mobile terminal, transmits the request for the control of the one or more operations to the vehicle, the information processor comprising:

a communicator that communicates with the mobile terminal and with the vehicle by transmitting and receiving information;

a memory that stores identification information that is specific to the vehicle and that is sent from the vehicle; and a control unit configured to:

(i) obtain a first set of identification information specific to the vehicle, the first set of identification information being obtained at a time when an ignition of the vehicle is turned off, (ii) store the first set of identification information in the memory, (iii) obtain a second set of identification information specific to the vehicle at a time that a request to control one or more operations is made by a user, (iv) make a matching judgment on whether the first set of identification information and the second set of identification information are identical or not, (v) judge whether to permit the control of the one or more operations of the vehicle based on the matching judgment, and (vi) prevent control of the one or more operations of the vehicle even if the first and second identification information are identical, when a distance comparison of a distance between the user at a time of making the request and the vehicle is more than a predetermined distance, the distance comparison occurring depending upon an activation status of a distance restriction unit that determines whether the distance between the user at the time of making the request exceeds the predetermined distance, wherein the control unit permits the control of the one or more operations of the vehicle when the first set of identification information and the second set of identification information are identical, and does not permit the control of the one or more operations of the vehicle when the first set of identification information and the second set of identification information are not identical.

8. The information processor according to claim 7, wherein the one or more operations of the vehicle include a door lock/unlock operation.

9. The information processor according to claim 7, wherein the one or more operations of the vehicle include a vehicle ignition start/stop operation.

10. An information processor that is outside of a vehicle and that is configured to be communicatively coupled to a mobile terminal and to the vehicle, and that, when receiving a request for control of one or more operations of the vehicle from the mobile terminal, transmits the request for the control of the one or more operations to the vehicle, the information processor comprising:
- a communicator that communicates with the mobile terminal and with the vehicle by transmitting and receiving information;
- a memory that stores identification information that is specific to the vehicle and that is sent from the vehicle; and
- a control unit configured to:
  - (i) obtain a first set of identification information specific to the vehicle, the first set of identification information being obtained at a time when an ignition of the vehicle is turned off,
  - (ii) store the first set of identification information in a memory,
  - (iii) obtain a second set of identification information specific to the vehicle at a time that a request to control one or more operations is made by a user,
  - (iv) when the communicator receives updated data of the identification information obtained at reconnection of a battery of the vehicle, make a matching judgment on whether the first set of identification information and the second set of identification information are identical or not,
  - (v) judge whether to permit the control of the one or more operations of the vehicle based on the matching judgment, and
  - (vi) prevent control of the one or more operations of the vehicle even if the first and second identification information are identical, when a distance comparison of a distance between the user at a time of making the request and the vehicle is more than a predetermined distance, the distance comparison occurring depending upon an activation status of a distance restriction unit that determines whether the distance between the user at the time of making the request exceeds the predetermined distance, wherein
- the control unit permits the control of the one or more operations of the vehicle when the first set of identification information and the second set of identification information are identical, and does not permit the control of the one or more operations of the vehicle when the first set of identification information and the second set of identification information are not identical.

11. The information processor according to claim 10, wherein the one or more operations of the vehicle include a door lock/unlock operation.

12. The information processor according to claim 10, wherein the one or more operations of the vehicle include a vehicle ignition start/stop operation.

* * * * *